(12) United States Patent
Cho et al.

(10) Patent No.: US 9,843,644 B2
(45) Date of Patent: Dec. 12, 2017

(54) MEASUREMENT INFORMATION UTILIZATION SYSTEM, AND USER PARTICIPATION-BASED MEASUREMENT INFORMATION UTILIZATION METHOD AND APPARATUS

(71) Applicant: ELECTRONICS AND TELECOMMUNICATIONS RESEARCH INSTITUTE, Daejeon (KR)

(72) Inventors: Young-Su Cho, Daejeon (KR); Joo-Young Kim, Daejeon (KR); Ju-Il Jeon, Daejeon (KR); Myung-In Ji, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/225,139

(22) Filed: Aug. 1, 2016

(65) Prior Publication Data

US 2017/0201591 A1    Jul. 13, 2017

(30) Foreign Application Priority Data

Jan. 12, 2016    (KR) ........................ 10-2016-0003855

(51) Int. Cl.
*H04W 24/00* (2009.01)
*H04L 29/08* (2006.01)
(Continued)

(52) U.S. Cl.
CPC .......... *H04L 67/22* (2013.01); *H04L 43/0876* (2013.01); *H04L 67/16* (2013.01); *H04W 4/02* (2013.01)

(58) Field of Classification Search
CPC ..... H04L 67/22; H04L 67/16; H04L 43/0876; H04W 4/02
See application file for complete search history.

(56) References Cited

U.S. PATENT DOCUMENTS

2011/0018732 A1    1/2011  Cho et al.
2011/0077021 A1*   3/2011  Mizikovsky ............ H04W 4/02
                                                 455/456.1
(Continued)

FOREIGN PATENT DOCUMENTS

KR    10-2011-0011546 A    2/2011
KR    10-2013-0089136 A    8/2013
KR    10-2014-0105782 A    9/2014

*Primary Examiner* — Ajit Patel
(74) *Attorney, Agent, or Firm* — LRK Patent Law Firm

(57) ABSTRACT

A user participation-based measurement information utilization system and a user participation-based measurement information utilization server and method. The user participation-based measurement information utilization server includes a measurement information collection unit for collecting user measurement information corresponding to at least one of sensor information and wireless communication heterogeneous infrastructure measurement information from a terminal of a user, on which a measurement information utilization application is installed, a pattern update unit for updating a user pattern corresponding to the user in a measurement information correlation database (DB) in accordance with the user measurement information based on a time at which the user measurement information is collected, and a service provision unit for providing measurement information utilization service to the user based on one or more similar patterns having a correlation with the user pattern among multiple patterns included in a measurement information list.

20 Claims, 18 Drawing Sheets

(51) Int. Cl.
*H04L 12/26* (2006.01)
*H04W 4/02* (2009.01)

(56) References Cited

U.S. PATENT DOCUMENTS

| | | | |
|---|---|---|---|
| 2013/0196685 A1* | 8/2013 | Griff | H04L 43/067 455/456.1 |
| 2013/0197799 A1 | 8/2013 | Cho et al. | |
| 2014/0228058 A1 | 8/2014 | Ji et al. | |
| 2014/0244661 A1* | 8/2014 | Peiris | G06F 17/30401 707/748 |
| 2014/0341198 A1 | 11/2014 | Han | |
| 2015/0077269 A1* | 3/2015 | Hua | H04W 4/02 340/870.16 |
| 2015/0201303 A1 | 7/2015 | Ji et al. | |
| 2016/0021494 A1* | 1/2016 | Yang | H04W 4/02 455/41.2 |
| 2016/0066151 A1* | 3/2016 | Palanki | H04L 67/10 455/456.1 |
| 2016/0205219 A1* | 7/2016 | Wang | H04W 4/02 709/203 |
| 2016/0353235 A1* | 12/2016 | Williams | H04W 4/02 |

* cited by examiner

MEASUREMENT INFORMATION UTILIZATION SYSTEM, AND USER PARTICIPATION-BASED MEASUREMENT INFORMATION UTILIZATION METHOD AND APPARATUS

CROSS REFERENCE TO RELATED APPLICATION

This application claims the benefit of Korean Patent Application No. 10-2016-0003855, filed Jan. 12, 2016, which is hereby incorporated by reference in its entirety into this application.

BACKGROUND OF THE INVENTION

1. Technical Field

The present invention generally relates to a user participation-based measurement information utilization system and, more particularly, to a measurement information utilization system and a user participation-based measurement information utilization method and apparatus, which can collect sensor information, wireless communication heterogeneous infrastructure measurement information, etc. from the terminals of users and can provide service using the collected information.

2. Description of the Related Art

Global Positioning System (GPS)-based positioning technology may provide information about the position of a user terminal equipped with a GPS receiver with a positional accuracy having an error of about several meters to several tens of meters in an outdoor area on the Earth by utilizing a GPS satellite. In the future, with the advent of additional wideband satellite navigation systems, such as the European Galileo or Russian GLONASS, the availability and accuracy of positioning in outdoor space are expected to be improved. However, in indoor areas and congested downtown areas, weak signals may be received due to being blocked by buildings, or positioning may be impossible or positioning accuracy may be deteriorated due to increased multipath error. Further, a problem also arises in that, due to the decrease in the number of visible satellites, the Time To First Fix (TTFF) is lengthened.

Mobile communication base station-based positioning technology can realize shortened TTFFs compared to GPS, but there is a disadvantage in that base station cell-based positioning, which is influenced by the array of base stations, typically has lower positioning accuracy than GPS.

Meanwhile, Wi-Fi-based positioning technology may provide precise position information having a position error of about several meters using the strengths of signals received from Wi-Fi Access Points (APs), in the interior of a building or a congested metropolitan area in which GPS signals cannot be received or a GPS position error is large. Recently, the area in which service is available has extended to large urban areas through Wardriving (or AP mapping) technology based on Skyhook Wireless in the United States. However, Wardriving (or AP mapping) technology using vehicles is problematic in that a lot of expense is required to initially construct the location database (DB) of Wi-Fi APs. Further, in the case of collection positions, collection is performed outdoors compared to the use of GPS position information, and thus a problem arises in that it is impossible to collect position information in indoor areas.

To date, technology for acquiring collection positions in indoor areas has used a scheme for selecting collection positions or areas (a room, a passage, a neighboring region of interest, etc.) indicated on an indoor map, or for allowing a user to input text. Further, in the mobile terminal, methods for dynamically providing collection positions in an indoor environment using an indoor map and information measured by sensors in the terminal are also presented.

However, the above-described initial collection methods may incur considerable maintenance expenses for re-collection whenever the positioning infrastructure in an indoor environment is changed. Moreover, an indoor environment may include a large number of buildings and may require the authorization of a building owner or an operator when information is collected, and thus such re-collection is not easy.

Further, from the standpoint of location-based service, existing location-based service generally determines the current location of a terminal, and provides content either at the corresponding location or within a predetermined range from the corresponding location. However, as a GPS chipset is generally mounted in a mobile terminal, location information may be generally provided in an outdoor environment. In contrast, in an indoor environment, it is not easy to provide indoor location information unless a location DB is generated in advance through a collection procedure. Further, since the availability of indoor location information is greatly influenced by the number and distribution of infrastructure elements, such as Wi-Fi networks or Bluetooth beacons, installed by existing mobile communication service providers or the like, the provision of location-based service based on high-precision indoor location information is greatly disadvantageous from the standpoint of service propagation.

In connection with this, Korean Patent Application Publication No. 10-2011-0011546 discloses a technology related to "DEVICE AND METHOD FOR COLLECTING INFORMATION RELATED TO INFRASTRUCTURE, AND POSITIONING METHOD AND SYSTEM USING THE SAME."

SUMMARY OF THE INVENTION

Accordingly, the present invention has been made keeping in mind the above problems occurring in the prior art, and an object of the present invention is to provide a location-based service, which collect sensor information and wireless communication heterogeneous infrastructure information of a user terminal, based on measurement information utilization applications that operate in the terminals of multiple unspecified normal users and which can be provided using the collected information.

Another object of the present invention is to provide a new location-based service based on measurement information rather than location information.

A further object of the present invention is to provide a method for collecting sensor information and wireless communication heterogeneous infrastructure measurement information as required by a measurement information utilization application without the user separately making effort to collect data on the terminal.

Yet another object of the present invention is to minimize additional development expense for protection and reduce the range of legal responsibility when location information is utilized, because the location information of each individual is not directly collected at the time of providing a location-based service.

In accordance with an aspect of the present invention to accomplish the above objects, there is provided a user participation-based measurement information utilization server, including a measurement information collection unit for collecting user measurement information corresponding to at least one of sensor information and wireless communication heterogeneous infrastructure measurement information from a terminal of a user, on which a measurement information utilization application is installed; a pattern update unit for updating a user pattern corresponding to the user in a measurement information correlation database (DB) in accordance with the user measurement information based on a time at which the user measurement information is collected; and a service provision unit for providing measurement information utilization service to the user based on one or more similar patterns having a correlation with the user pattern among multiple patterns included in a measurement information list.

The service provision unit may include a spatial correlation detection unit for detecting spatial correlations between positioning infrastructure elements corresponding to the wireless communication heterogeneous infrastructure measurement information, based on multiple pieces of wireless communication heterogeneous infrastructure measurement information respectively corresponding to the multiple patterns; and a similar pattern extraction unit for extracting the one or more similar patterns corresponding to at least one positioning infrastructure element included in a preset reference level layer in a hierarchical structure generated based on the spatial correlations.

The correlation with the terminal may be higher as a level of the hierarchical structure becomes lower.

The similar pattern extraction unit may generate the hierarchical structure based on a reception range of radio waves corresponding to the terminal.

The measurement information utilization service may be at least one of a message-sending service for sending a message, received together with user measurement information from the terminal, to terminals corresponding to the one or more similar patterns, and a search service for providing the terminal with measurement information of a pattern that matches a search condition received together with the user measurement information from the terminal, among the one or more similar patterns, based on the search condition.

The user measurement information may be collected by the terminal detecting at least one preset automatic collection trigger among operations performed by the user based on the measurement information utilization application.

The at least one automatic collection trigger may correspond to at least one of a send button pressing time corresponding to a Social Network Service (SNS) program, a keyword search button pressing time corresponding to a search program; a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

The sensor information may be collected in response to at least one of a preset sensor information collection period and the at least one automatic collection trigger, and is collected using at least one of an acceleration sensor, a gyroscope, a geomagnetic sensor, a barometric sensor, and a camera.

The user measurement information may be generated by temporally synchronizing and combining the sensor information with the wireless communication heterogeneous infrastructure measurement information.

The measurement information list may include the multiple patterns respectively corresponding to multiple users registered in the measurement information utilization application.

In accordance with another aspect of the present invention to accomplish the above objects, there is provided a terminal including a trigger detection unit for detecting at least one preset automatic collection trigger, among operations performed by a user; a collection unit for, when the at least one automatic collection trigger is detected, collecting at least one of sensor information and wireless communication heterogeneous infrastructure measurement information at a current location, based on a measurement information utilization application; a measurement information generation unit for generating user measurement information by temporally synchronizing and combining the sensor information with the wireless communication heterogeneous infrastructure measurement information; and a measurement information transmission unit for transmitting the user measurement information to a measurement information utilization server so as to be provided with measurement information utilization service corresponding to the current location.

In accordance with a further aspect of the present invention to accomplish the above objects, there is provided a user participation-based measurement information utilization method performed by a user participation-based measurement information utilization system, including collecting, by a terminal, user measurement information corresponding to at least one of sensor information and wireless communication heterogeneous infrastructure measurement information based on a measurement information utilization application; and updating, by a measurement information utilization server, a user pattern corresponding to a user of the terminal in accordance with the user measurement information, based on a time at which the user measurement information is collected, and providing, by the measurement information utilization server, measurement information utilization service to the user based on one or more similar patterns having a correlation with the user pattern, among multiple patterns included in a measurement information list.

Providing the measurement information utilization service may include detecting spatial correlations between positioning infrastructure elements corresponding to the wireless communication heterogeneous infrastructure measurement information, based on multiple pieces of wireless communication heterogeneous infrastructure measurement information respectively corresponding to the multiple patterns; and extracting the one or more similar patterns corresponding to at least one positioning infrastructure element included in a preset reference level layer in a hierarchical structure generated based on the spatial correlations.

The correlation with the terminal may be higher as a level of the hierarchical structure becomes lower.

Providing the measurement information utilization service may be configured to generate the hierarchical structure based on a reception range of radio waves corresponding to the terminal.

The measurement information utilization service may be at least one of a message-sending service for sending a message, received together with user measurement information from the terminal, to terminals corresponding to the one or more similar patterns, and a search service for providing the terminal with measurement information of a pattern that matches a search condition received together with the user measurement information from the terminal, among the one or more similar patterns, based on the search condition.

The e user measurement information may be collected by the terminal detecting at least one preset automatic collection trigger among operations performed by the user based on the measurement information utilization application, and the at least one automatic collection trigger may correspond to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

The sensor information may be collected in response to at least one of a preset sensor information collection period and the at least one automatic collection trigger, and is collected using at least one of an acceleration sensor, a gyroscope, a geomagnetic sensor, a barometric sensor, and a camera.

The user measurement information may be generated by temporally synchronizing and combining the sensor information with the wireless communication heterogeneous infrastructure measurement information.

The measurement information list may include the multiple patterns respectively, corresponding to multiple users registered in the measurement information utilization application.

The user participation-based measurement information utilization method may further include calculating, by a location information provision server, location information of the terminal by comparing information in a location DB with the user measurement information.

The user participation-based measurement information utilization method may further include, when location input information input by the user together with the user measurement information is received, determining, by the location information provision server, whether the location input information is included in a preset correlation level in a hierarchical structure generated based on location information, and then applying the location input information to the location DB.

The user participation-based measurement information utilization method may further include updating, by the location information provision server, the location DB based on the measurement information list at regular intervals of a preset update period.

Further, in accordance with yet another aspect to accomplish the above objects of the present invention, there is provided a computer program stored in a medium to execute the above-described method.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
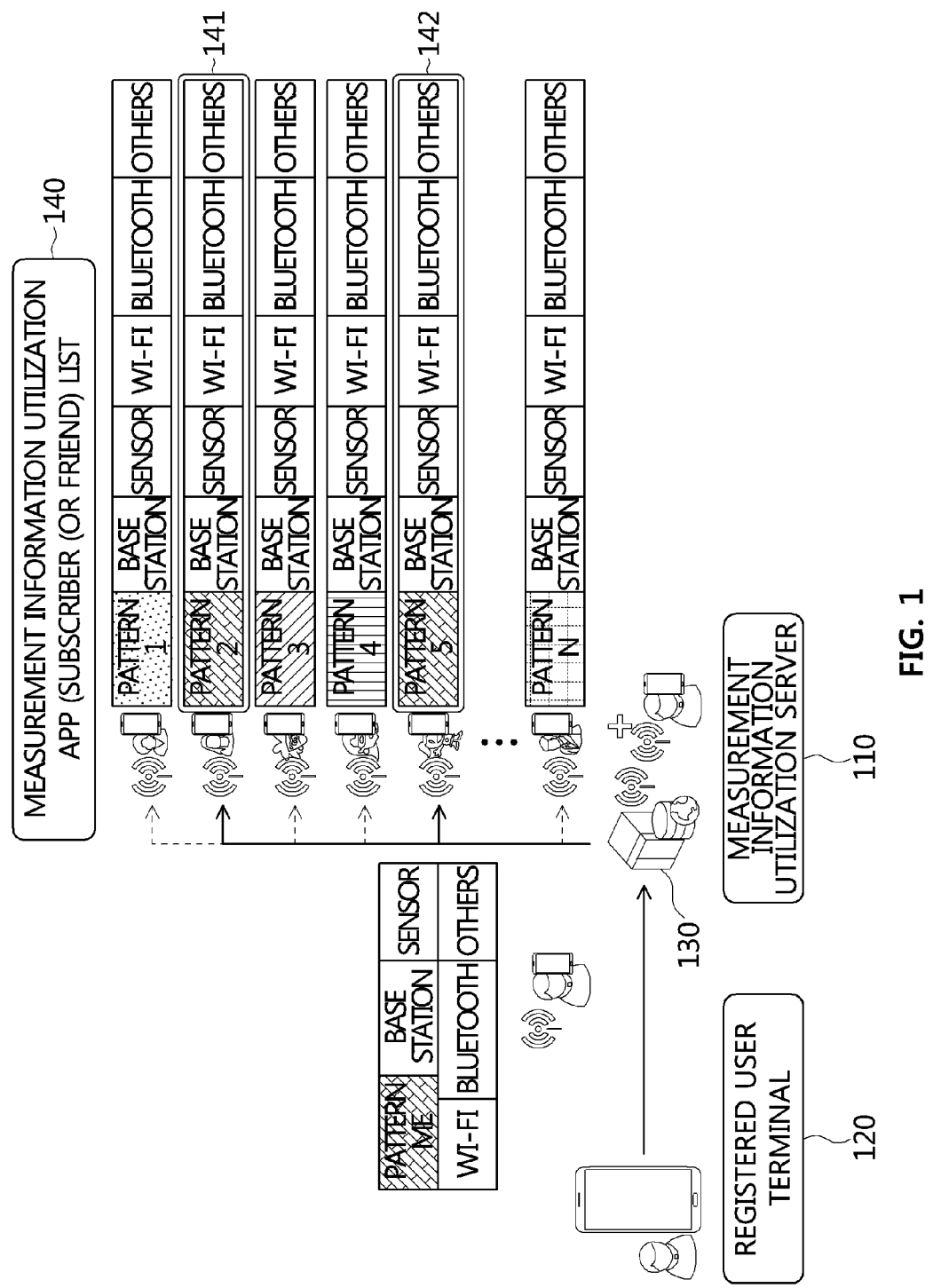
FIG. 1 is a diagram showing a user participation-based measurement information utilization system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram showing a user participation-based measurement information utilization system according to an embodiment of the present invention.

Referring to FIG. 1, the user participation-based measurement information utilization system according to the embodiment of the present invention includes a measurement information utilization server 110, a registered user terminal 120, and a measurement information correlation database (DB) 130.

Here, the user participation-based measurement information utilization system will be described below in the sequence of the provision of a measurement information utilization service.

First, the registered user terminal 120 may collect user measurement information using a previously installed measurement information utilization application. That is, the registered user terminal 120 may correspond to a terminal registered in the service through the measurement information utilization application.

Here, the user measurement information may include sensor information and wireless communication heterogeneous infrastructure measurement information.

In this case, the registered user terminal 120 may collect user measurement information by detecting at least one automatic collection trigger registered through the measurement information utilization application even if the user does not perform an operation of separately setting or inputting information for collection.

Here, the sensor information may be collected based on an acceleration sensor, a gyroscope, a geomagnetic sensor, a barometric sensor, a camera, etc. provided in the registered user terminal 120.

Further, the wireless communication heterogeneous infrastructure measurement information may be collected through a heterogeneous infrastructure measurement information collection module in the registered user terminal 120. Here, the heterogeneous infrastructure measurement information collection module may collect wireless communication heterogeneous infrastructure measurement information in synchronization with various types of sensors.

Thereafter, user measurement information may be transmitted to the measurement information utilization server 110 through the measurement information utilization application.

Here, a separate message or a search condition input by the user, or user location input information personally input by the user, may be transmitted, together with the user measurement information, to the measurement information utilization server 110.

Thereafter, the measurement information utilization server may update a user pattern based on the received user measurement information. Here, before the update, past patterns may be stored in the measurement information utilization server 110.

Here, the user pattern may be utilized as attribute information that enables spatial characteristics of the user, rather than the location information of the user, to be identified.

The measurement information utilization server 10 may include a measurement information correlation DB 130.

The measurement information correlation DB 130 may correspond to a DB that defines correlations between positioning infrastructure elements based on a measurement information list generated by receiving user measurement information from multiple specified users who have subscribed to the measurement information utilization service.

Therefore, a spatial correlation with the user pattern may be detected based on the measurement information correlation DB 130, and pieces of pattern information 141 and 142 similar to the user pattern may be extracted from a subscriber list 140.

Here, patterns similar to the user pattern may be extracted from the range of a reference level layer set by the user in a hierarchical structure generated based on the spatial correlation.

Thereafter, a measurement information utilization service, such as by sending a message, input by the user, to users corresponding to the pieces of pattern information 141 and 142 similar to the user pattern, may be provided.

Figure 2:
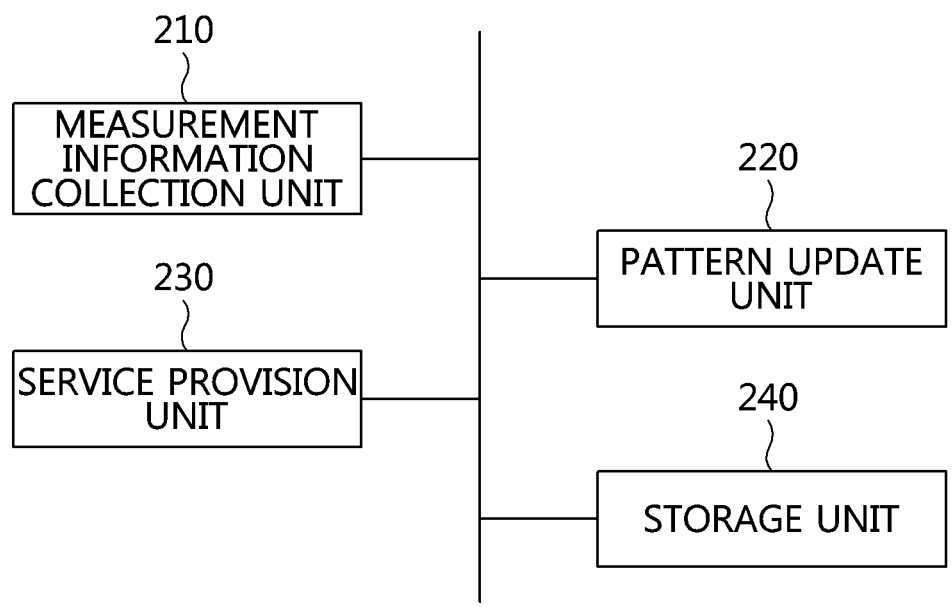
FIG. 2 is a block diagram showing a user participation-based measurement information utilization server according to an embodiment of the present invention.

FIG. 2 is a block diagram showing a user participation-based measurement information utilization server according to an embodiment of the present invention.

Referring to FIG. 2, the user participation-based measurement information utilization server according to the embodiment of the present invention includes a measurement information collection unit 210, a pattern update unit 220, a service provision unit 230, and a storage unit 240.

The measurement information collection unit 210 collects user measurement information corresponding to at least one of sensor information and wireless communication heterogeneous infrastructure measurement information from the terminal of the user on which the measurement information utilization application is installed.

The measurement information utilization application may be a user application program that includes a measurement information collection module for utilizing the user participation-based measurement information utilization service on the user terminal.

The user measurement information may be generated by temporally synchronizing and combining the sensor information with the wireless communication heterogeneous infrastructure measurement information. That is, since modules for collecting the sensor information and the wireless communication heterogeneous infrastructure measurement information in the terminal are different from each other, pieces of information collected from the respective modules may be combined such that pieces of information collected in the same time slot are synchronized with each other.

Here, the message or a search condition input by the user, or location input information, may be combined with user measurement information and collected together. For example, when a message, a keyword or address information is input from the user through the measurement information utilization application, the collected sensor information and wireless communication heterogeneous infrastructure measurement information may be combined with the input information to generate user measurement information. Alternatively, only the sensor information and the wireless communication heterogeneous infrastructure measurement information may be combined to generate user measurement information. The user measurement information may be transmitted in association with the information input by the user at the time of transmission.

Here, the message may correspond to information such as a short message, a long message, a picture, a video, an emoticon, a discount coupon, and an advertisement, which can be sent by the user in the measurement information utilization application.

Here, the sensor information may be collected in response to at least one of a preset sensor information collection period and at least one automatic collection trigger, and may be collected using at least one of an acceleration sensor, a gyroscope, a geomagnetic sensor, a barometric sensor, and a camera.

Further, the wireless communication heterogeneous infrastructure measurement information may be collected through a separate heterogeneous infrastructure measurement information collection module, and may also be collected at the time at which sensor information is collected in synchronization with various types of sensors for collecting the sensor information.

Here, the wireless communication heterogeneous infrastructure measurement information may include the identification numbers (Cell-ID, MAC Address, Universally Unique Identifier (UM), or the like) of a mobile communication base station and a Short Range Node (SRN: short-range transmission/reception device) and measurement values (Received signal strength indication (RSSI), Round Trip time (RTT), Angle Of Arrival (AOA), etc.). Further, the SRN may include Wi-Fi, Bluetooth, Bluetooth Low Energy (BLE), and Near-Field Communication (NFC) nodes.

Here, the user measurement information may be collected by detecting at least one preset automatic collection trigger from among operations performed by the user, based on the measurement information utilization application on the terminal.

At this time, the user may be a user who has subscribed or has been registered with the measurement information utilization service according to the present invention. Therefore, in the measurement information utilization application, the operation of the user may function as a trigger for collecting the user measurement information, thus initiating the collection of the user measurement information.

Here, the at least one automatic collection trigger may correspond to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

For example, in the case of the SNS program, the operation of pressing a send button for transmitting text, a picture, or a video may correspond to a trigger operation, and in the case of the search program, the operation of inputting a keyword and pressing a search button may correspond to the trigger operation. In another example, in the case of a navigation program, the time at which the current location information is calculated in order to search for a path or the time at which the location information is displayed together with the path may be detected as a preset automatic collection trigger. Further, in the case of a location-based discount coupon and an advertisement provision program, the time at which a discount coupon is provided or the time at which an advertisement is provided may be detected as a preset automatic collection trigger. In a further example, in the case of a location-based payment program, the time at which a payment flow is initiated may be detected as a preset automatic collection trigger.

The pattern update unit 220 updates a user pattern corresponding to the user in accordance with the user measurement information in the measurement information correlation DB based on the time at which the user measurement information is collected.

Here, the user pattern may be utilized as attribute information required to identify the spatial characteristics of the user, rather than the user's location information, when the measurement information utilization service according to the present invention is provided. Therefore, in order to identify the spatial characteristics of the user corresponding to the time at which the user measurement information is collected, that is, the latest time, from the terminal of the user, the user pattern may be updated in accordance with the user measurement information.

Here, before updating the user pattern, past pattern histories may be stored in predetermined memory space of the measurement information utilization server. The past pattern histories stored in this way may be utilized together with the latest user pattern, depending on the correlation condition stored in the measurement information utilization server.

The measurement information utilization server may include a measurement information correlation DB for collecting user measurement information from multiple specified users who have subscribed to the measurement information utilization service and then generating a measurement information list.

Further, the user pattern may be stored in the measurement information correlation DB.

The service provision unit 230 provides a measurement information utilization service to the corresponding user based on one or more similar patterns having a correlation with the user pattern among the multiple patterns included in the measurement information list. That is, based on the user pattern rather than based on the user's location information, users determined to be located in a place close to the user are extracted, and then the measurement information utilization service may be provided.

The measurement information correlation DB may define reception correlations and frequencies between multiple positioning infrastructure elements, based on pieces of information stored in the measurement information list. For example, assuming that multiple Wi-Fi APs are uniformly distributed in a certain environment, the probability that the user will receive signals from the multiple Wi-Fi APs at a certain point in that environment may be high. Therefore, correlations between the Wi-Fi APs depending on the locations thereof may be detected by receiving pieces of user measurement information from the multiple unspecified users, who have subscribed to the measurement information utilization service, at that certain point in that certain environment.

Here, the spatial correlations between positioning infrastructure elements corresponding to wireless communication heterogeneous infrastructure measurement information may be detected based on multiple pieces of wireless communication heterogeneous infrastructure measurement information respectively corresponding to the multiple patterns.

Here, the measurement information list may include multiple patterns respectively corresponding to multiple users who have registered in the measurement information utilization application.

Therefore, multiple pieces of wireless communication heterogeneous infrastructure measurement information are acquired from the multiple patterns corresponding to multiple users, and thus spatial correlations between positioning infrastructure elements may be detected in an environment in which pieces of wireless communication heterogeneous infrastructure measurement information corresponding to the user patterns are present.

Here, the spatial correlations may be generated and used between homogeneous positioning infrastructure elements. Further, the frequencies with which multiple positioning infrastructure signals are simultaneously received are indicated together with the spatial correlations, and thus the correlations between the positioning infrastructure elements may be indicated in greater detail.

Further, one or more similar patterns corresponding to at least one positioning infrastructure element included in a preset reference level layer may be extracted from the hierarchical structure generated based on the spatial correlations.

In this case, the hierarchical structure may correspond to the indication of several positioning infrastructure elements included in the corresponding layer, among various level layers generated based on the positioning infrastructure element corresponding to the terminal of the user. Here, the positioning infrastructure element corresponding to the terminal of the user may be the positioning infrastructure element corresponding to the wireless communication heterogeneous infrastructure measurement information included in the user measurement information.

Here, as the level of the hierarchical structure is lower, the correlation with the terminal may be higher.

For example, when a Wi-Fi AP corresponding to the terminal of the user is assumed to be AP #1, APs having a higher correlation with the AP #1 may be included in a low level layer in the hierarchical structure. That is, APs located spatially closer to the AP #1 may be included in the low level layer.

Here, the hierarchical structure may be generated based on the reception range of radio waves corresponding to the terminal. That is, when the reception range of radio waves corresponding to the user terminal is wide, many signals from positioning infrastructure elements may be simultaneously received at the location of the terminal, and thus the number of positioning infrastructure elements included in the low level layer in the hierarchical structure may increase, compared to the case of a terminal for which the reception range of radio waves is narrow.

Therefore, the accuracy of extracted similar patterns may be improved by setting a preset reference layer according to the terminal.

Here, each of one or more similar patterns may be a pattern having information about positioning infrastructure elements included in the set reference layer as user measurement information. That is, when another terminal is located in a place spatially close to the user terminal, a positioning infrastructure signal received by the other terminal may be similar to the positioning infrastructure signal received by the user terminal. Therefore, the pattern in which the signal of a positioning infrastructure element, which is included in the preset reference layer and has a high spatial correlation with the user terminal, is received may be extracted as a similar pattern.

Here, the measurement information utilization service may be at least one of a message-sending service for sending a message, received together with user measurement information from the terminal, to the terminals corresponding to one or more similar patterns, and a search service for providing the terminal with the measurement information of patterns that match a search condition received together with the user measurement information from the terminal, among one or more similar patterns based on the search condition.

For example, in the case of a message-sending service, when discount information of a store is input as a message through a terminal provided in the store, the measurement information utilization service may be used to transmit discount information to the terminals of users corresponding to a pattern similar to that of the terminal located in the store. That is, the users located spatially close to the store may be induced to purchase commodities in the store by providing information about the store to the users.

In another example, in the case of a search service, when the user enters 'popular restaurant' as a search condition at the current location, patterns having information that corresponds to a pattern similar to that of the terminal and matches 'popular restaurant', which is the search condition, may be searched for. When patterns having information that corresponds to a pattern similar to that of the terminal and matches 'popular restaurant' are found, information corresponding to the patterns may be provided to the terminal of the user. Here, as the information corresponding to the patterns, pictures, comments, or Uniform Resource Locators (URLs) pertaining to the popular restaurants may be provided.

As described above, the storage unit 240 stores various types of information generated during a user participation-based measurement information utilization procedure according to the embodiment of the present invention.

According to an embodiment, the storage unit 240 may be configured independent of the user participation-based measurement information utilization server, thus supporting a function for user participation-based measurement information utilization. In this case, the storage unit 240 may function as separate large-capacity storage or may include a control function for performing operations.

Meanwhile, the user participation-based measurement information utilization server may be equipped with memory and may then store information in the memory. In an embodiment, the memory is a computer-readable storage medium. In an embodiment, the memory may be a volatile memory unit, and in another embodiment, the memory may be a nonvolatile memory unit. In an embodiment, a storage device is a computer-readable storage medium. In various different embodiments, the storage device may include, for example, a hard disk device, an optical disk device, or other types of large-capacity storage devices.

By means of the user participation-based measurement information utilization server, the sensor information and the wireless communication heterogeneous infrastructure measurement information of the user terminals may be collected, utilized, and provided based on respective measurement information utilization applications that operate on the terminals of multiple unspecified normal users.

Further, a new location-based service based on measurement information rather than location information may be provided.

Furthermore, there can be provided a method for collecting sensor information and wireless communication heterogeneous infrastructure measurement information as required by the measurement information utilization application, without the user separately making effort to collect information on the terminal.

Furthermore, when the location-based service is provided, personal location information is not directly collected, and thus additional development costs for privacy protection may be minimized and the range of legal responsibility may be narrowed when location information is utilized.

Figure 3:
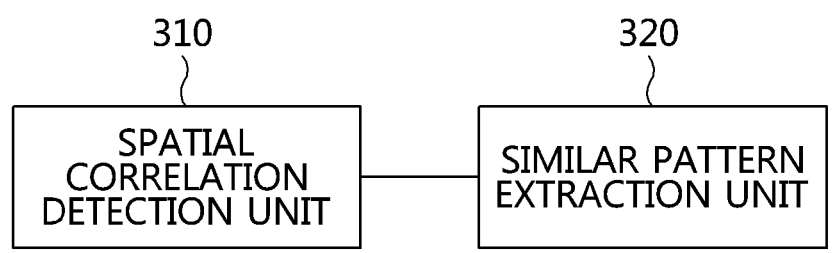
FIG. 3 is a block diagram showing an example of the service provision unit shown in FIG. 2.

FIG. 3 is a block diagram showing an example of the service provision unit shown in FIG. 2.

Referring to FIG. 3, the service provision unit 230 shown in FIG. 2 includes a spatial correlation detection unit 310 and a similar pattern extraction unit 320.

The spatial correlation detection unit 310 detects spatial correlations between positioning infrastructure elements corresponding to wireless communication heterogeneous infrastructure measurement information based on multiple pieces of wireless communication heterogeneous infrastructure measurement information respectively corresponding to multiple patterns.

Here, the measurement information correlation DB may define reception correlations and frequencies between multiple positioning infrastructure elements, based on pieces of information stored in the measurement information list. For example, assuming that multiple Wi-Fi APs are uniformly distributed in a certain environment, the probability that the user will receive signals from the multiple Wi-Fi APs at a certain point in that environment may be high. Therefore, correlations between the Wi-Fi APs depending on the locations thereof may be detected by receiving pieces of user measurement information from the multiple unspecified users, who have subscribed to the measurement information utilization service, at that certain point in that certain environment.

Here, the measurement information list may include multiple patterns respectively corresponding to multiple users who have registered in the measurement information utilization application.

Therefore, multiple pieces of wireless communication heterogeneous infrastructure measurement information are acquired from the multiple patterns corresponding to multiple users, and thus spatial correlations between positioning infrastructure elements may be detected in an environment in which pieces of wireless communication heterogeneous infrastructure measurement information corresponding to the user patterns are present.

Here, the spatial correlations may be generated and used between homogeneous positioning infrastructure elements. Further, the frequencies with which multiple positioning infrastructure signals are simultaneously received are indicated together with the spatial correlations, and thus the correlations between the positioning infrastructure elements may be indicated in greater detail.

The similar pattern extraction unit 320 extracts one or more similar patterns corresponding to at least one positioning infrastructure element included in a preset reference level layer from the hierarchical structure generated based on the spatial correlation.

In this case, the hierarchical structure may correspond to the indication of several positioning infrastructure elements included in the corresponding layer, among various level layers generated based on the positioning infrastructure element corresponding to the terminal of the user. Here, the positioning infrastructure element corresponding to the terminal of the user may be the positioning infrastructure element corresponding to the wireless communication heterogeneous infrastructure measurement information included in the user measurement information.

Here, as the level of the hierarchical structure is lower, the correlation with the terminal may be higher.

For example, when a Wi-Fi AP corresponding to the terminal of the user is assumed to be AP #1, APs having a higher correlation with the AP #1 may be included in a low level layer in the hierarchical structure. That is, APs located spatially closer to the AP #1 may be included in the low level layer.

Here, the hierarchical structure may be generated based on the reception range of radio waves corresponding to the terminal. That is, when the reception range of radio waves corresponding to the user terminal is wide, many signals from positioning infrastructure elements may be simultaneously received at the location of the terminal, and thus the number of positioning infrastructure elements included in the low level layer in the hierarchical structure may increase, compared to the case of a terminal for which the reception range of radio waves is narrow.

Therefore, the accuracy of extracted similar patterns may be improved by setting a preset reference layer according to the terminal.

Here, each of one or more similar patterns may be a pattern having information about positioning infrastructure elements included in the set reference layer as user measurement information. That is, when another terminal is located in a place spatially close to the user terminal, a positioning infrastructure signal received by the other terminal may be similar to the positioning infrastructure signal received by the user terminal. Therefore, the pattern in which the signal of a positioning infrastructure element, which is included in the preset reference layer and has a high spatial correlation with the user terminal, is received may be extracted as a similar pattern.

Figure 4:
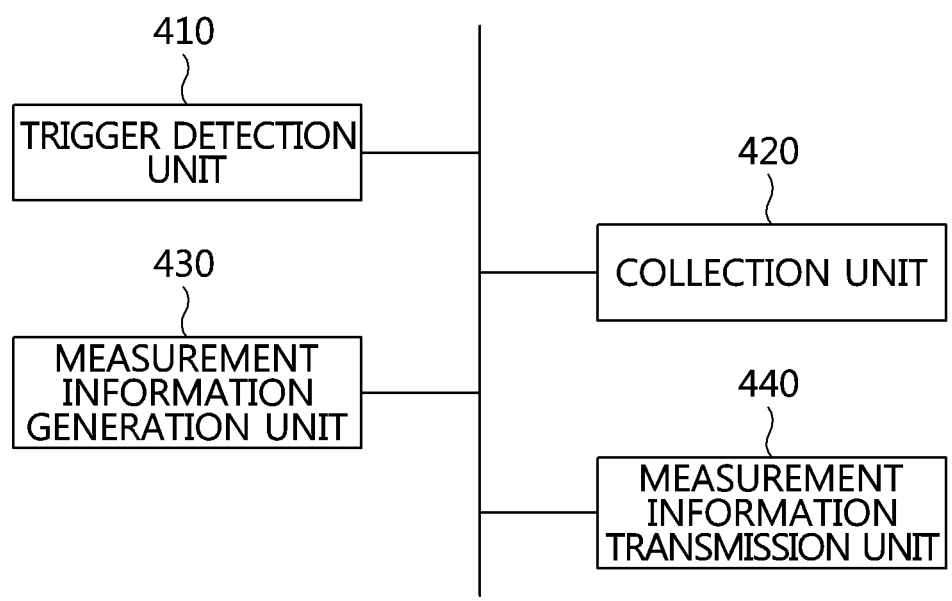
FIG. 4 is a block diagram showing a terminal according to an embodiment of the present invention.

FIG. 4 is a block diagram showing a terminal according to an embodiment of the present invention.

Referring to FIG. 4, the terminal according to the embodiment of the present invention includes a trigger detection unit 410, a collection unit 420, a measurement information generation unit 430, and a measurement information transmission unit 440.

The trigger detection unit 410 detects at least one preset automatic collection trigger among operations performed by the user.

In this case, whether a preset automatic collection trigger has occurred may be detected through the measurement information utilization application.

Here, the measurement information utilization application may correspond to a user application program including a measurement information collection module for using a user participation-based measurement information utilization service on the terminal of the user.

Here, the user may be a user who has subscribed or registered with the measurement information utilization service according to the present invention. Therefore, the operation of the user functions as a trigger for collecting user measurement information on the measurement information utilization application, thus initiating the collection of the user measurement information.

Here, the at least one automatic collection trigger may correspond to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

When at least one automatic collection trigger is detected, the collection unit 420 collects at least one of sensor information and wireless communication heterogeneous infrastructure measurement information at the current location based on the measurement information utilization application.

Here, the sensor information is collected in response to at least one of a preset sensor information collection period and at least one automatic collection trigger, and may be collected using at least one of an acceleration sensor, a gyroscope, a geomagnetic sensor, a barometric sensor, and a camera.

Further, the wireless communication heterogeneous infrastructure measurement information may be collected through a separate heterogeneous infrastructure measurement information collection module, which is synchronized with various types of sensors for collecting sensor information, and thus the wireless communication heterogeneous infrastructure measurement information may also be collected at the time at which sensor information is collected.

Here, the wireless communication heterogeneous infrastructure measurement information may include the identification numbers (Cell-ID, MAC Address, UUID), or the like) of a mobile communication base station and a Short Range Node (SRN: short-range transmission/reception device) and measurement values (RSSI, RTT, AOA, etc.). Further, the SRN may include Wi-Fi, Bluetooth, BLE, and NFC nodes.

The measurement information generation unit 430 generates user measurement information by temporally synchronizing and combining the sensor information with the wireless communication heterogeneous infrastructure measurement information. That is, since modules for collecting the sensor information and the wireless communication heterogeneous infrastructure measurement information in the terminal are different from each other, pieces of information collected from the respective modules may be combined such that pieces of information collected in the same time slot are synchronized with each other.

Here, the message or a search condition input by the user, or location input information, may be combined with user measurement information and collected together. For example, when a message, a keyword or address information is input from the user through the measurement information utilization application, the collected sensor information and wireless communication heterogeneous infrastructure measurement information may be combined with the input information to generate user measurement information.

The measurement information transmission unit 440 transmits the user measurement information to the measurement information utilization server so as to be provided with the measurement information utilization service corresponding to the current location.

Figure 5:
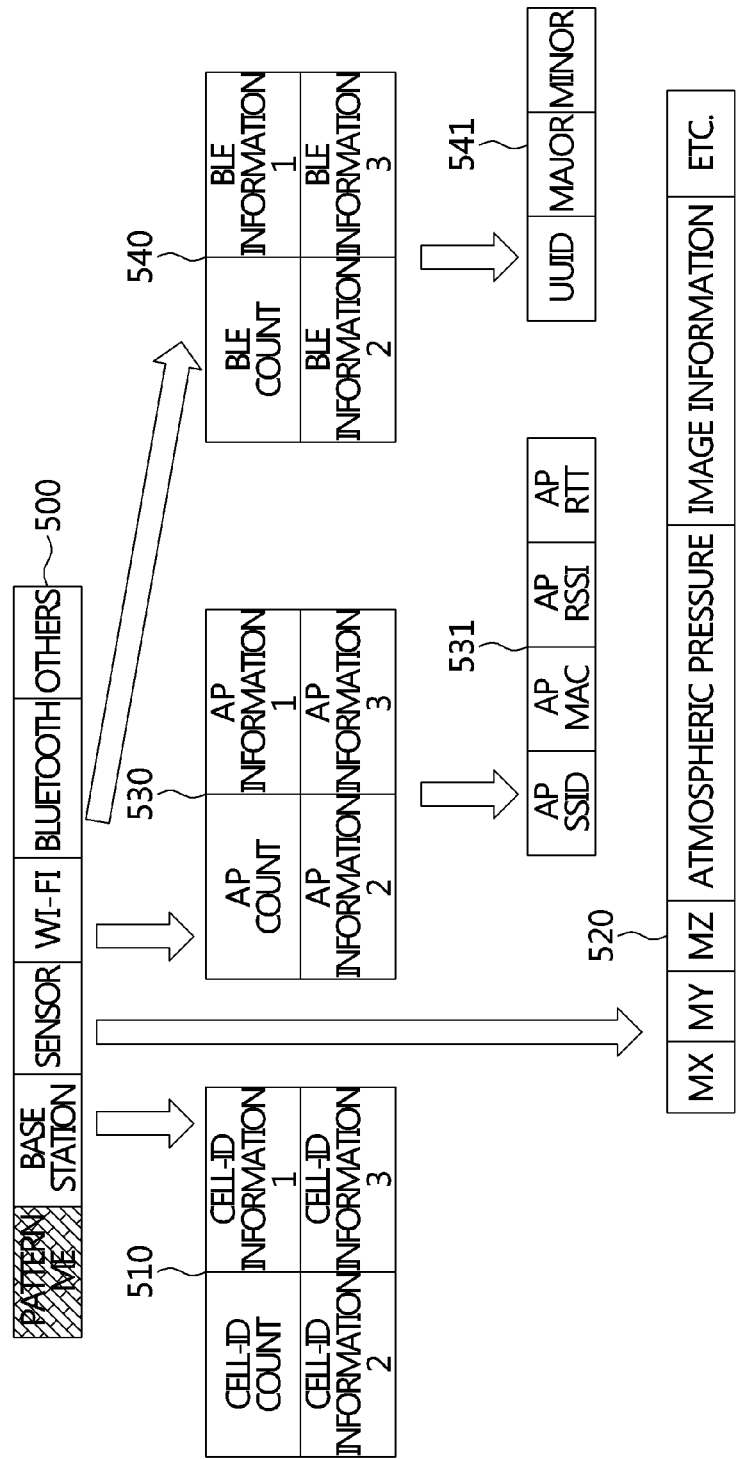
FIG. 5 is a diagram showing an example of user measurement information according to the present invention.

FIG. 5 is a diagram showing an example of user measurement information according to an embodiment of the present invention.

Referring to FIG. 5, user measurement information 500 of the present invention may include base station measurement information 510, sensor information 520, Wi-Fi measurement information 530, Bluetooth measurement information 540, and other types of positioning infrastructure measurement information.

The base station measurement information 510 may include identification information, such as a cell identifier, that is, Cell-ID.

The sensor information 520 may include acceleration information, 3-axis based gravity information, geomagnetic information, atmospheric pressure information, image information captured by a camera, etc. depending on the types of sensors installed in the terminal.

The Wi-Fi measurement information 530 may include pieces of information for respective Wi-Fi APs from which information is received. For example, the Wi-Fi measurement information 530 may include information including the AP identifier (AP SSID), AP signal strength (RSSI), AP signal roundtrip time (RTT), etc. of AP #1, such as Wi-Fi AP information 1 531, for each AP.

The Bluetooth measurement information 540 may include pieces of information for each BLE device from which information is received, similar to the Wi-Fi measurement information 530. For example, the Bluetooth measurement information 540 may include the application identifier (UUID), local (major) ID, a sub-local (minor) ID, etc. of BLE device 41, such as BLE information 1 541.

Figure 6:
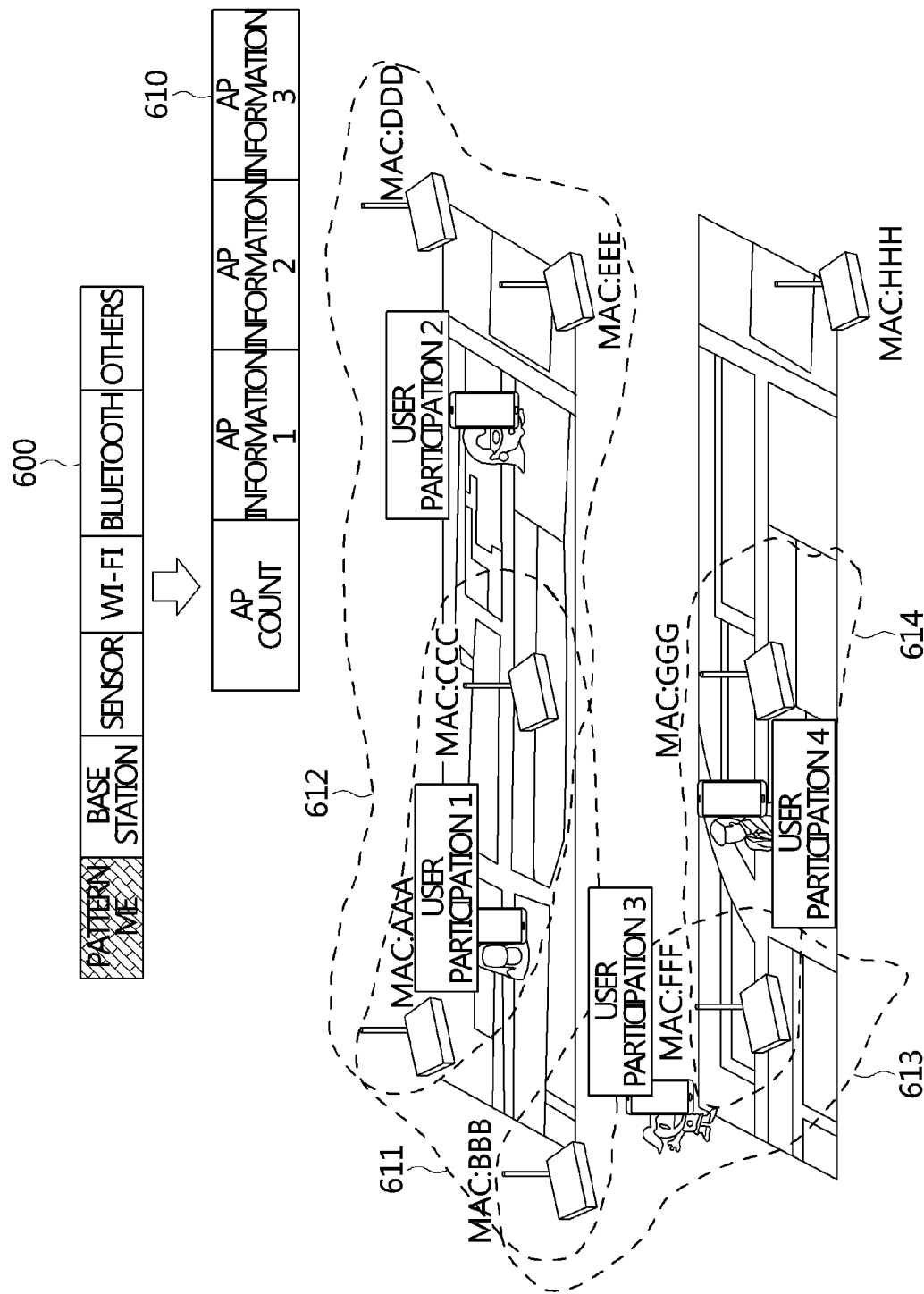
FIGS. 6 and 7 are diagrams showing an example of the generation of a measurement information correlation DB according to the present invention.
Figure 7:
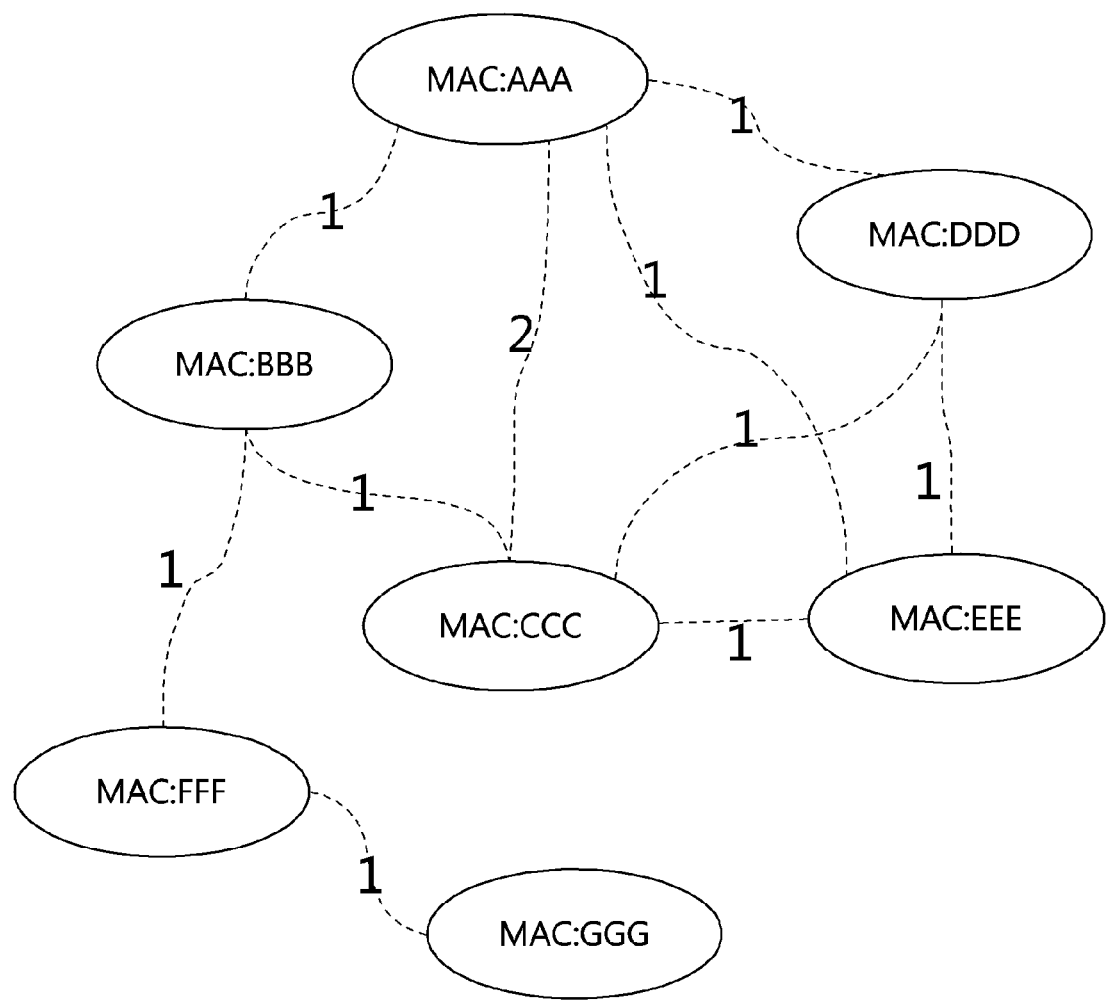

FIGS. 6 and 7 are diagrams showing an example of the generation of a measurement information correlation DB according to the present invention.

Referring to FIGS. 6 and 7, a procedure for generating a measurement information correlation DB according to the present invention may acquire user measurement information 600 corresponding to users who have subscribed to a measurement information utilization service through a measurement information list.

Although only Wi-Fi AP information, among various types of positioning infrastructure measurement information included in the user measurement information, is described in FIG. 6 for the convenience of description, this procedure may also be extended and applied to other positioning infrastructure elements.

Assuming that multiple Wi-Fi APs are uniformly distributed in a certain environment, as shown in FIG. 6, the probability that multiple Wi-Fi AP signals will be received at a certain point may be high.

For example, it may be assumed that, as shown in FIG. 6, four users have transmitted Wi-Fi AP measurement information to the measurement information utilization server through measurement information utilization applications installed on the terminals. Here, it can be seen that multiple Wi-Fi APs from which signals are received by the terminals are indicated as being included in the signal reception areas 611, 612, 613, and 614 of the four terminals, depending on the reception ranges of radio waves corresponding to the four terminals, respectively, as shown in FIG. 6. That is, it can be seen that the user participation 1 terminal receives signals from three Wi-Fi APs, the MAC addresses of which are AAA, BBB, and CCC, respectively, and that the user participation 2 terminal receives signals from four Wi-Fi APs, the MAC addresses of which are AAA, CCC, DDD, and EEE, respectively.

In this way, among the multiple Wi-Fi APs, Wi-Fi APs from which signals are simultaneously received by a single terminal may be determined to have high spatial proximity.

Therefore, identification information about all Wi-Fi APs included in multiple pieces of Wi-Fi measurement information provided by multiple users is displayed, and spatial correlations between the multiple Wi-Fi APs may be associated with each other, as shown in FIG. 7, based on the signal reception areas 611, 612, 613, and 614 of the terminals shown in FIG. 6. Thereafter, for a pair of neighboring Wi-Fi APs, the frequency with which Wi-Fi AP signals are simultaneously received is indicated by a number, and thus a measurement information correlation DB may be generated.

The measurement information correlation DB generated in this way cannot accurately provide the location of the user, but may promptly define the approximate spatial correlations of the user using the measurement information. Further, since the correlations may be updated in proportion to the number of users who participate in the measurement information utilization service, the measurement information correlation DB may be used for an indoor environment location-based service, which is plagued by the problem of high re-collection expense, and may then solve the expense problem.

Figure 8:
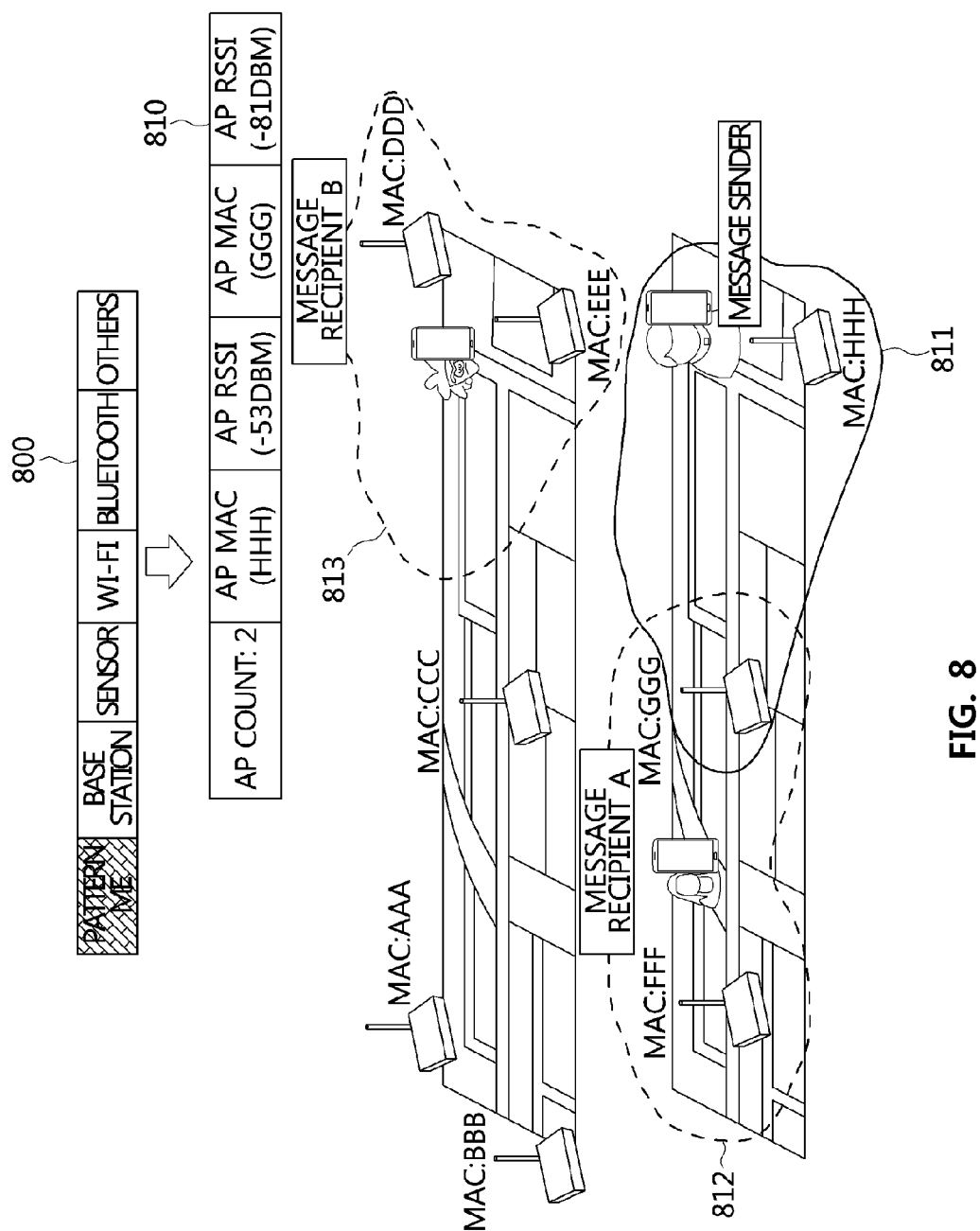
FIGS. 8 and 9 are diagrams showing an example of the generation of a hierarchical structure according to the present invention.
Figure 9:
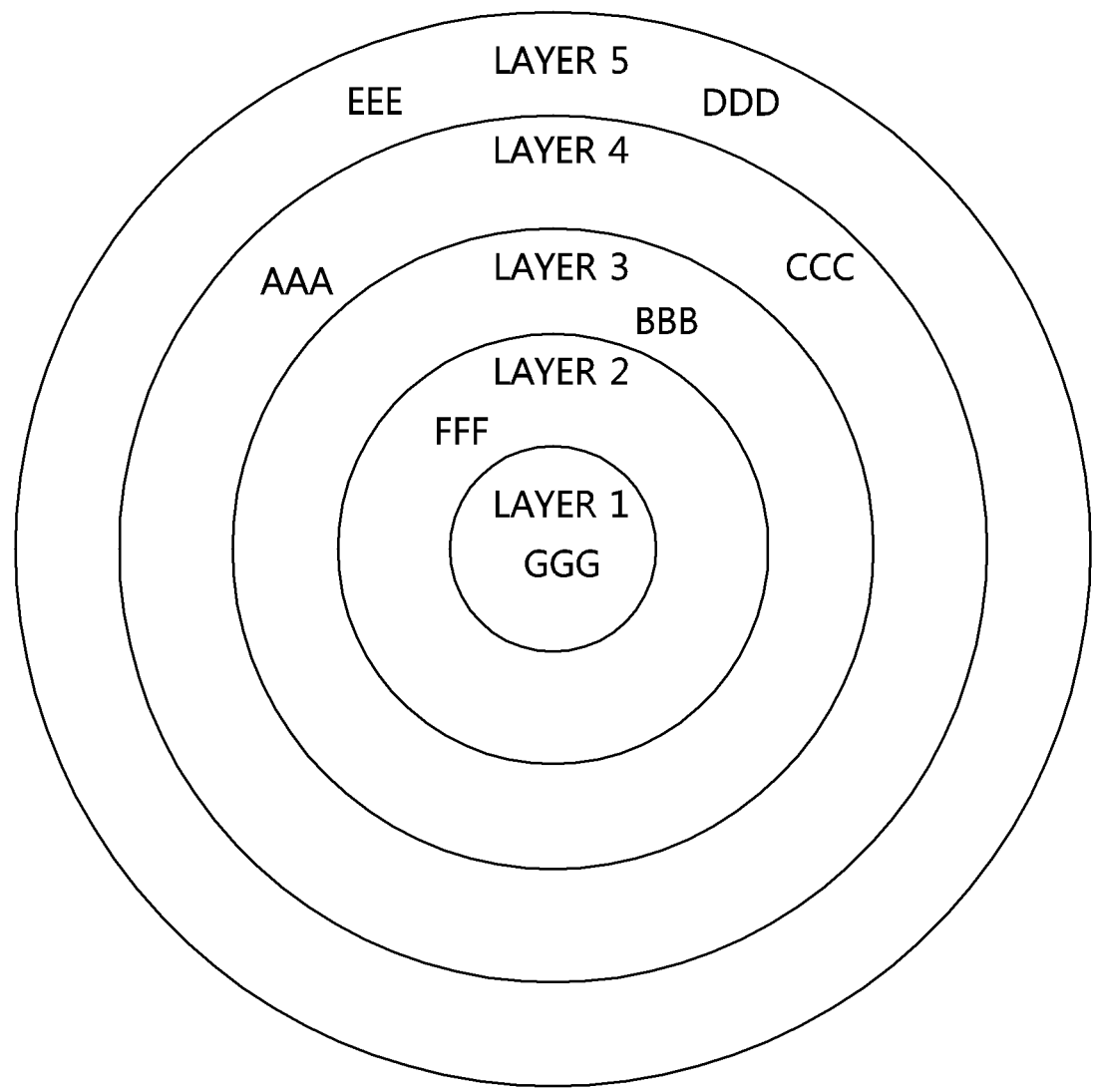

FIGS. 8 to 9 are diagrams showing an example of the generation of a hierarchical structure according to the present invention.

Referring to FIGS. 8 and 9, it can be seen that FIG. 8 shows the same environment as FIG. 6. Therefore, the same DB as the measurement information correlation DB used in FIG. 6, that is, the measurement information correlation DB of FIG. 7, may be used.

Here, a procedure for generating a hierarchical structure in the case where a message sender who desires to send a message is located in the rightmost portion of a lower layer may be described.

For example, it may be assumed that message recipients capable of receiving the message are two persons 'a' and 'b', as shown in FIG. 8. Here, the MAC addresses of Wi-Fi APs included in the Wi-Fi measurement information 810 received by the message sender may be included in the layer 1 level of a hierarchical structure, as shown in FIG. 9. Here, according to the measurement information 810, Wi-Fi APs, the MAC addresses of which are GGG and HHH, correspond to the layer 1 level, but the Wi-Fi AP, the MAC address of which is HHH, is a new Wi-Fi AP, which was not included in the Wi-Fi measurement information provided by four users in FIG. 6. Thus, information about the new AP may not be included in the measurement information correlation DB shown in FIG. 7. Therefore, the Wi-Fi AP, the MAC address of which is HHH, may be excluded from the layer 1 level.

Thereafter, the MAC address of a Wi-Fi AP directly adjacent to the Wi-Fi AP corresponding to the layer 1 level may be included in the layer 2 level, as shown in FIG. 9, using the measurement information correlation DB of FIG. 7. By means of this method, the MAC addresses of Wi-Fi APs, which are sequentially adjacent to the Wi-Fi AP in the layer 2 level, may be included in the layer 3 level, the layer 4 level, and the layer 5 level.

The hierarchical structure ultimately generated in this way may correspond to that of FIG. 9.

Consequently, the measurement information utilization server may determine the reception ranges of message recipients that are present in the same environment as the message sender, as in the following Table 1, by utilizing the hierarchical structure of FIG. 9.

TABLE 1

| Maximum message sending range | Message recipient capable of receiving message |
|---|---|
| Layer 1 level | a |
| Layer 2 level | a |
| Layer 3 level | a |
| Layer 4 level | a |
| Layer 5 level | a, b |

For example, it may be assumed that a location-based shop advertising service is provided in an indoor environment, such as in a department store, an airport, a subway station, or an exhibition center. At this time, it may be assumed that a message sender is the owner of the shop, and intends to limitedly provide discount advertisement information to nearby users, who have subscribed to the service, in a time period characterized by low sales, using the location-based shop advertising service.

Here, to promptly sell commodities within a limited time at a low price, it may be very important to selectively send discount advertisement messages to subscribers who are located in the vicinity of the shop, from among multiple subscribers who have subscribed to the service.

Therefore, as shown in FIG. 8, when the message sender sends a discount advertisement message, together with the Wi-Fi measurement information 810, to the measurement information utilization server, the measurement information utilization server generates a hierarchical structure, such as that of FIG. 9, using both the user measurement information and the measurement information correlation DR.

Thereafter, the measurement information utilization server may determine the allowable layer to which the advertisement message is to be delivered, and may send the advertisement message to subscribers having the MAC addresses included in the determined allowable layer as a user pattern.

Here, as the user pattern, past user patterns as well as the latest user pattern may also be used. Meanwhile, all users who have registered and subscribed to the measurement information utilization service must update their user patterns with the latest information, either periodically or whenever sending/receiving messages, and may also store the past user patterns.

According to the above example, the message recipient 'a', in the vicinity of the message sender, may receive discount advertisement messages from layers ranging from the layer 1 level, and message recipient 'b', present in another layer, may receive discount advertisement messages from layers ranging from the layer 5 level. That is, the message sender may adjust the number of message recipients by adjusting the sending range of messages using layer level values. Further, by means of this adjustment, it may be possible to provide an efficient location-based service without using location information.

Figure 10:
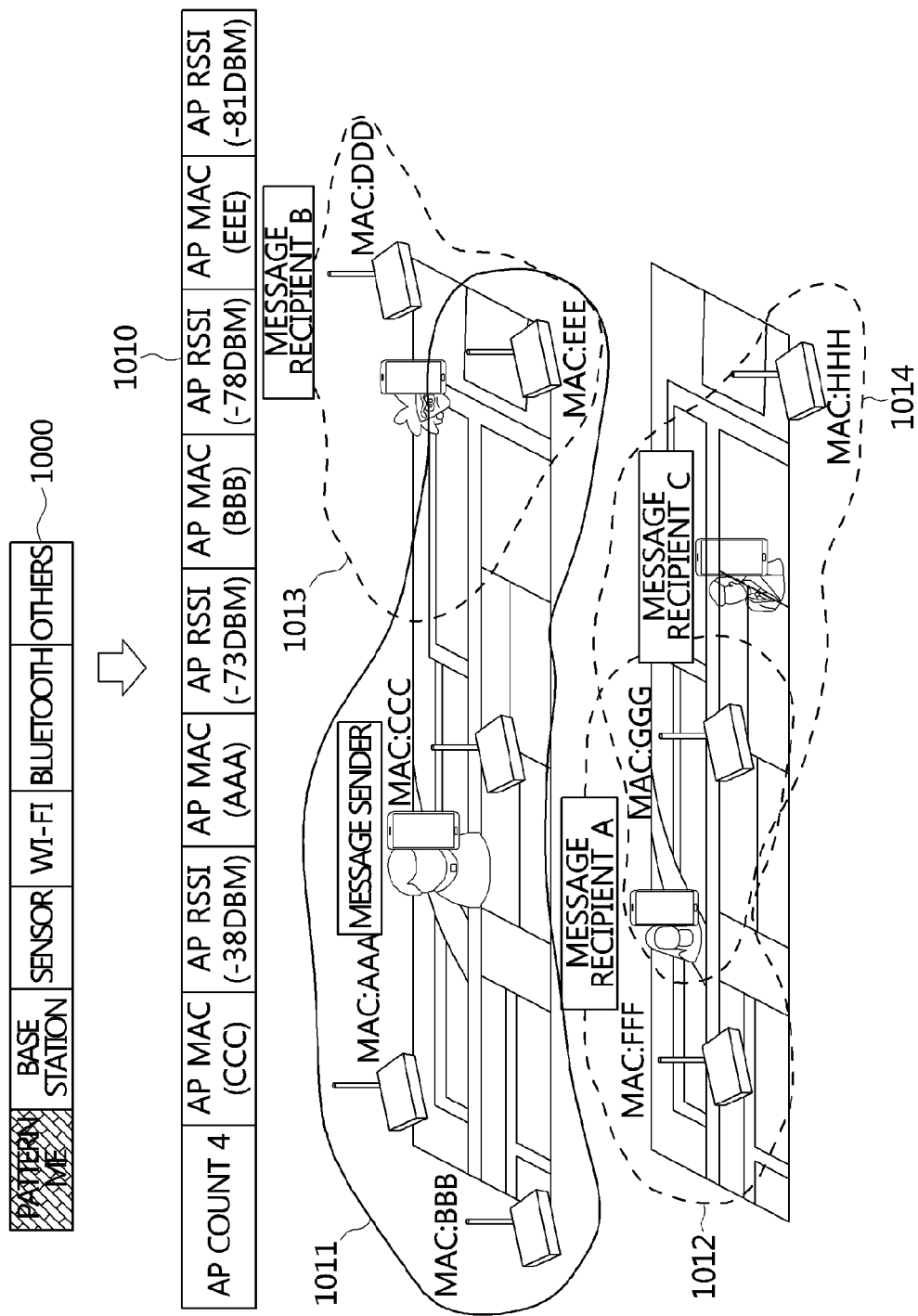
FIGS. 10 and 11 are diagrams showing another example of the generation of a hierarchical structure according to the present invention.
Figure 11:
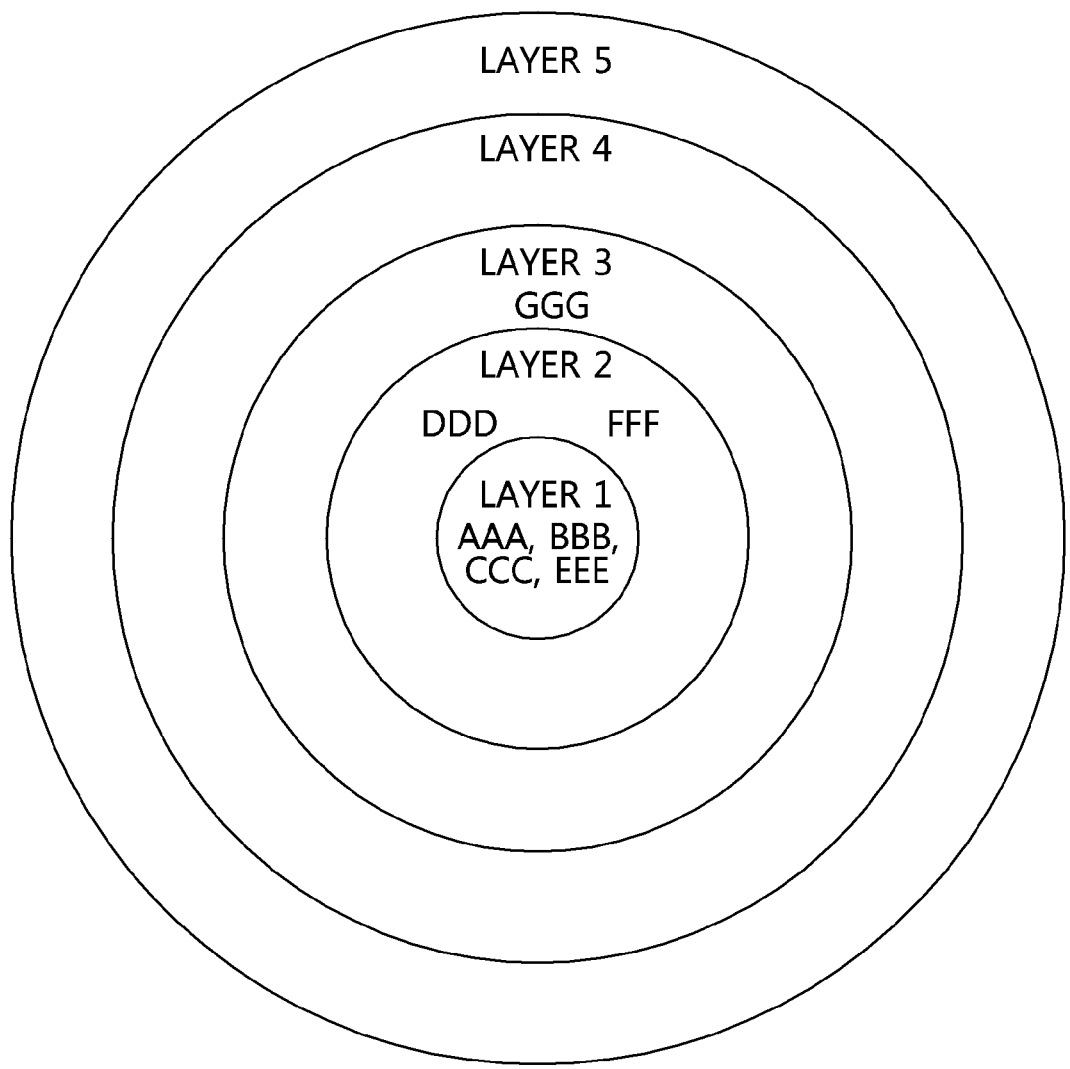

FIGS. 10 and 11 are diagrams showing another example of the generation of a hierarchical structure according to the present invention.

Referring to FIGS. 10 and 11, it can be seen that FIG. 10 shows the same environment as FIG. 8. Therefore, the measurement information correlation DB identical to that of FIG. 6, that is, the measurement information correlation DB of FIG. 7, may be used.

Here, it can be seen that the message sender of FIG. 10 is present in a layer that is different from that of the message sender of FIG. 8.

Further, it can also be seen that, compared to the message sender of FIG. 8, the message sender of FIG. 10 has the wide reception range of Wi-Fi AP signals corresponding to the terminal thereof, and thus there are MAC addresses of many Wi-Fi APs included in the layer 1 level, as shown in FIG. 11. Accordingly, as shown in Table 2, all of message recipients 'a', 'b', and 'c' may receive messages from layers ranging from the layer 3 level.

TABLE 2

| Maximum message sending range | Message recipient capable of receiving message |
|---|---|
| Layer 1 level | b |
| layer 2 level | b, a |
| layer 3 level | b, a, c |
| layer 4 level | b, a, c |
| layer 5 level | b, a, c |

That is, as shown in FIG. 10, it may be estimated that the reception range of radio waves depending on the type of terminal of the message sender may influence the generation of the hierarchical structure.

Figure 12:
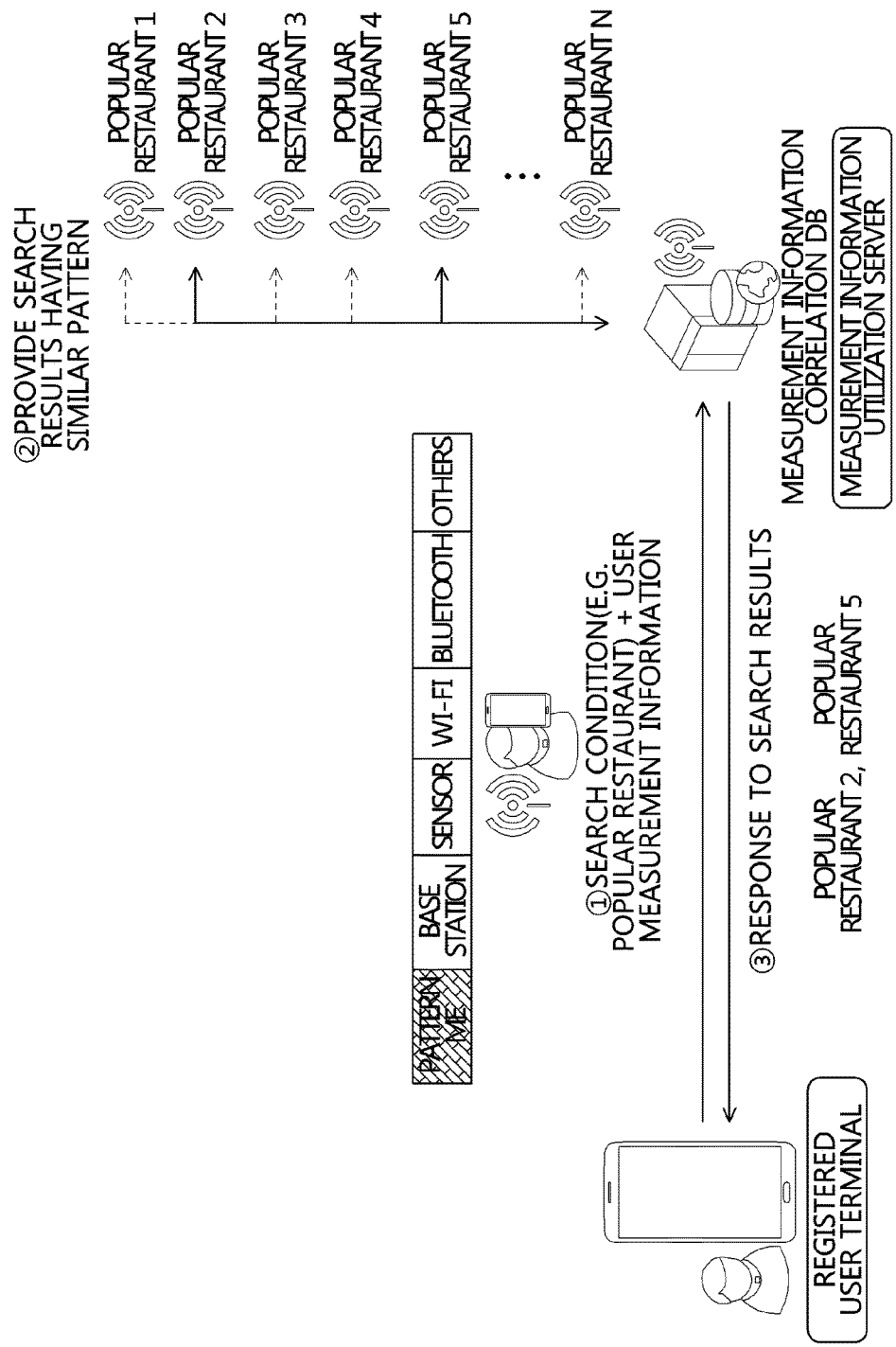
FIG. 12 is a diagram showing an example of a measurement information utilization service for providing search results based on a search condition according to the present invention.

FIG. 12 is a diagram showing an example of a measurement information utilization service for providing search results based on a search condition according to the present invention.

Referring to FIG. 12, in the measurement information utilization service for providing search results based on a search condition according to the present invention, a user may first transmit both a search condition and user measurement information to a measurement information utilization server through a measurement information utilization application. For example, as shown in FIG. 12, the user may input the word 'popular restaurant' as the search condition, and may transmit the word together with the user measurement information.

Here, an operation of pressing a search button and requesting a search after the user has input the search condition may function as an automatic trigger for collecting user measurement information, thus initiating the collection of measurement information.

Here, the search condition may correspond to one or more arbitrary keywords and search phrases.

Thereafter, the measurement information utilization server may receive the search condition and the user measurement information and may compare the user measurement information with information stored in the measurement information correlation DB.

Thereafter, in the hierarchical structure based on the correlation, among pieces of search information present in a preset reference layer, information matching the search condition input by the user may be indicated as search results. For example, pictures, comments, or URL information pertaining to popular restaurants may be indicated as the search results.

Thereafter, the search results may be provided to the terminal of the user.

The measurement information utilization service for providing the search results in this way may be advantageous in that, even if the user does not provide direct location information, location-based search service may be provided using only user measurement information. Further, after the range of search is primarily limited based on user measurement information, ultimate search results matching the search condition may be secondarily extracted, thus enabling the service to be more efficiently provided.

Figure 13:
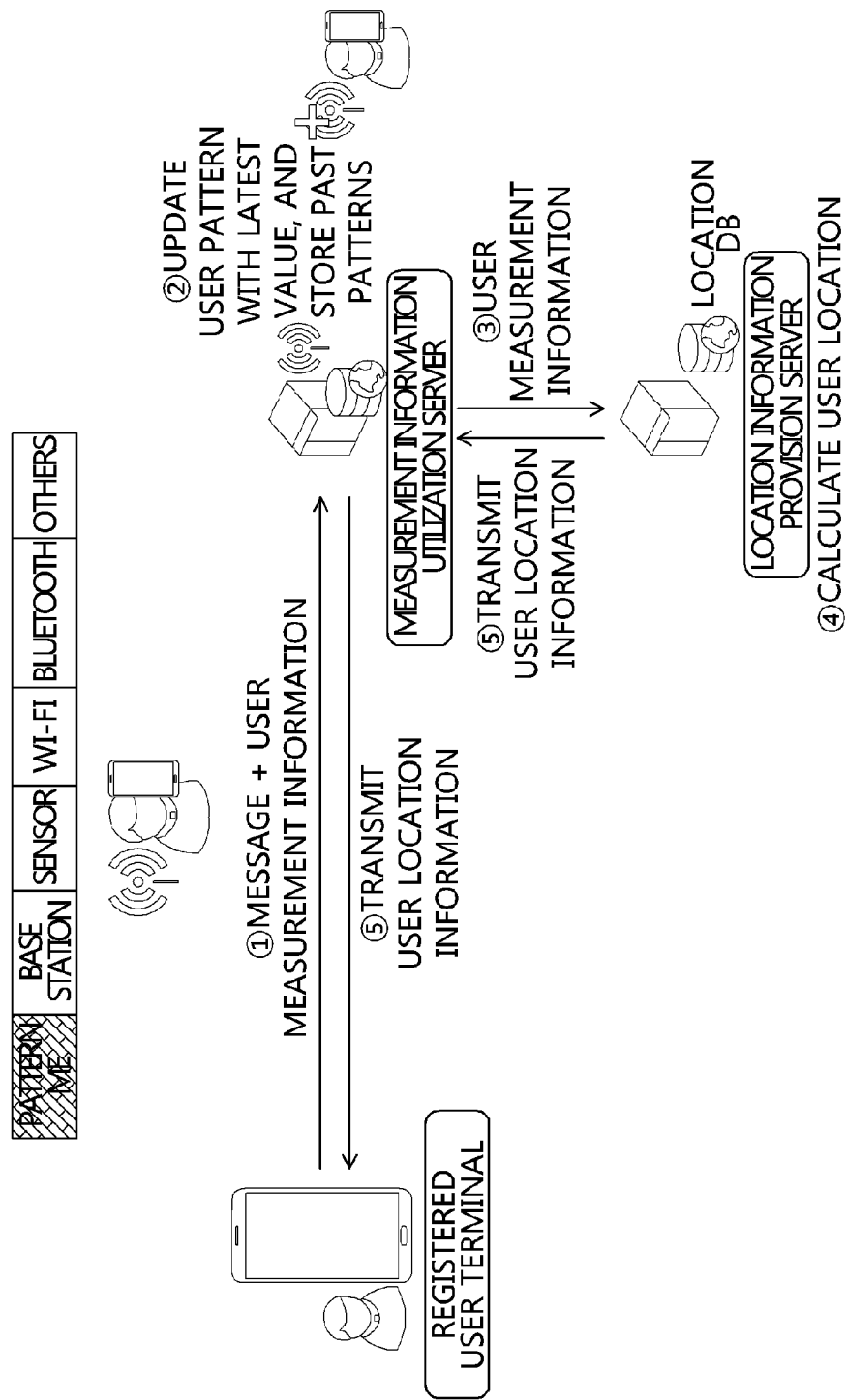
FIG. 13 is a diagram showing a procedure for providing location information based on a location information provision server according to an embodiment of the present invention.

FIG. 13 is a diagram showing a procedure for providing location information based on a location information provision server according to an embodiment of the present invention.

Referring to FIG. 13, location information provision service may be provided to a user based on the location information provision server according to an embodiment of the present invention.

First, similar to the provision of the measurement information utilization service, the structure of the location information provision service is configured such that a measurement information utilization server may acquire user measurement information, together with a message, from a user terminal registered in the measurement information utilization application.

Thereafter, the measurement information utilization server may update a user pattern with user measurement information.

Thereafter, the measurement information utilization server may transfer the user measurement information to the location information provision server so as to be provided with the location information of the user.

Here, the location information provision server may calculate the location of the user by comparing the sensor information and the wireless communication heterogeneous infrastructure measurement information, which are included in the user measurement information, with a location DB in which information is calculated and stored in advance.

Thereafter, the location information provision server may transfer the calculated location information of the user to the measurement information utilization server, and may allow the calculated location information to be transmitted to the terminal of the user.

Here, the location information provision service of FIG. 13 may be selectively executed only when the measurement information utilization server requires the location information of the user.

Figure 14:
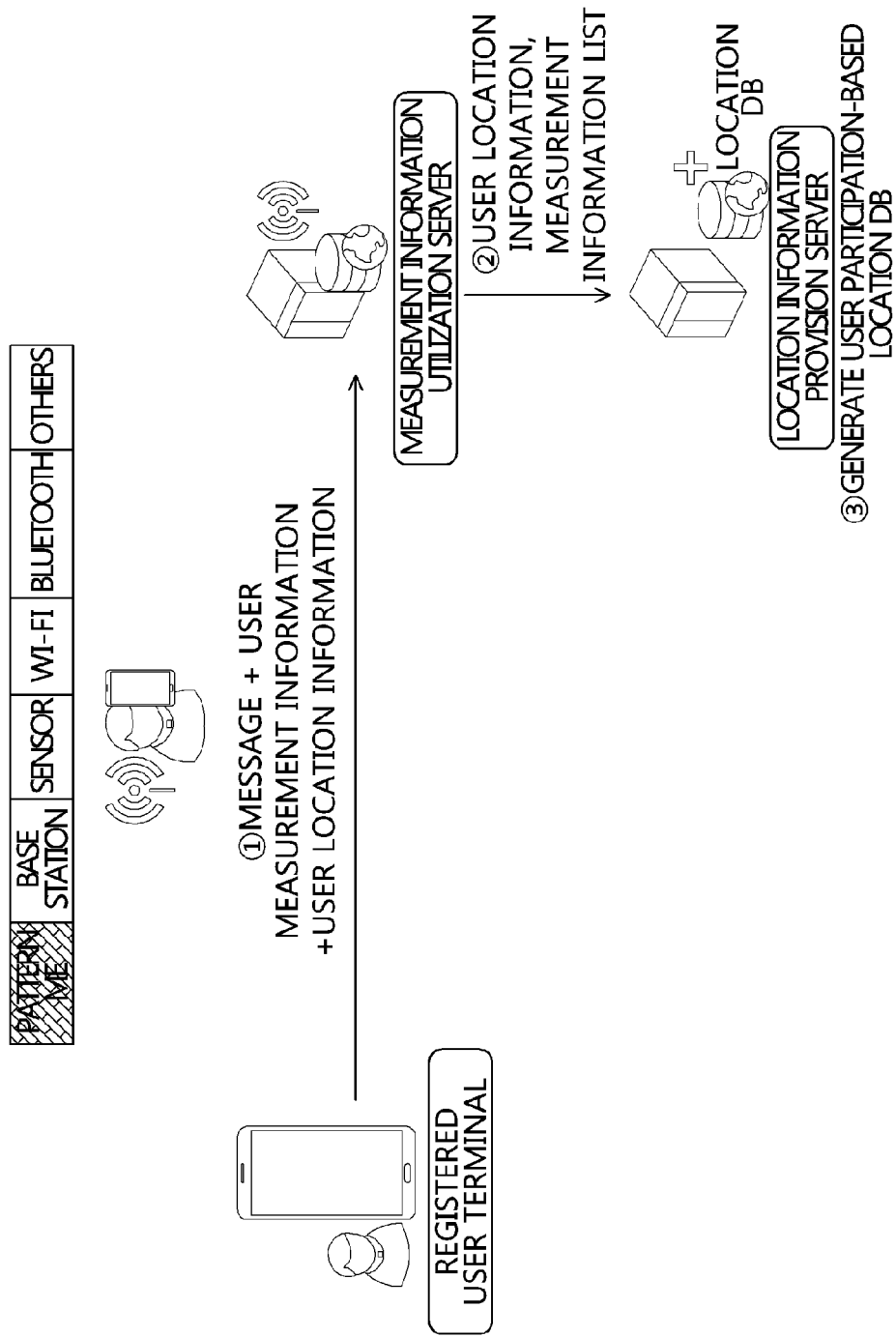
FIG. 14 is a diagram showing a procedure for generating a location DB using user measurement information according to an embodiment of the present invention.

FIG. 14 is a diagram showing a procedure for generating a location DB using user measurement information according to an embodiment of the present invention.

Referring to FIG. 14, in order to generate the location DB using user measurement information according to the embodiment of the present invention, it may be effective when a user who transmits user measurement information may input or calculate location information with very high accuracy.

For example, assuming that the user is the owner of a specific shop, the user may accurately input the address of the shop through a measurement information utilization application, and may then send a discount advertisement message, together with user measurement information, to the measurement information utilization server.

Thereafter, the measurement information utilization server, having received the message and the user measurement information, may forward the address of the shop, input by the user, together with the user measurement information to the location information provision server, and the location information provision server may newly generate a location DB related to the location information of the user based on the address of the shop.

In this regard, to check whether the location information input by the user is accurate, the user measurement information received together with the address of the shop may be compared with measurement information corresponding to the location information close to the address of the shop in the existing location DB. For example, the location corresponding to the address of the shop may be generated as information for a new location DB only when the location information has a correlation of a predetermined reference or more.

Figure 15:
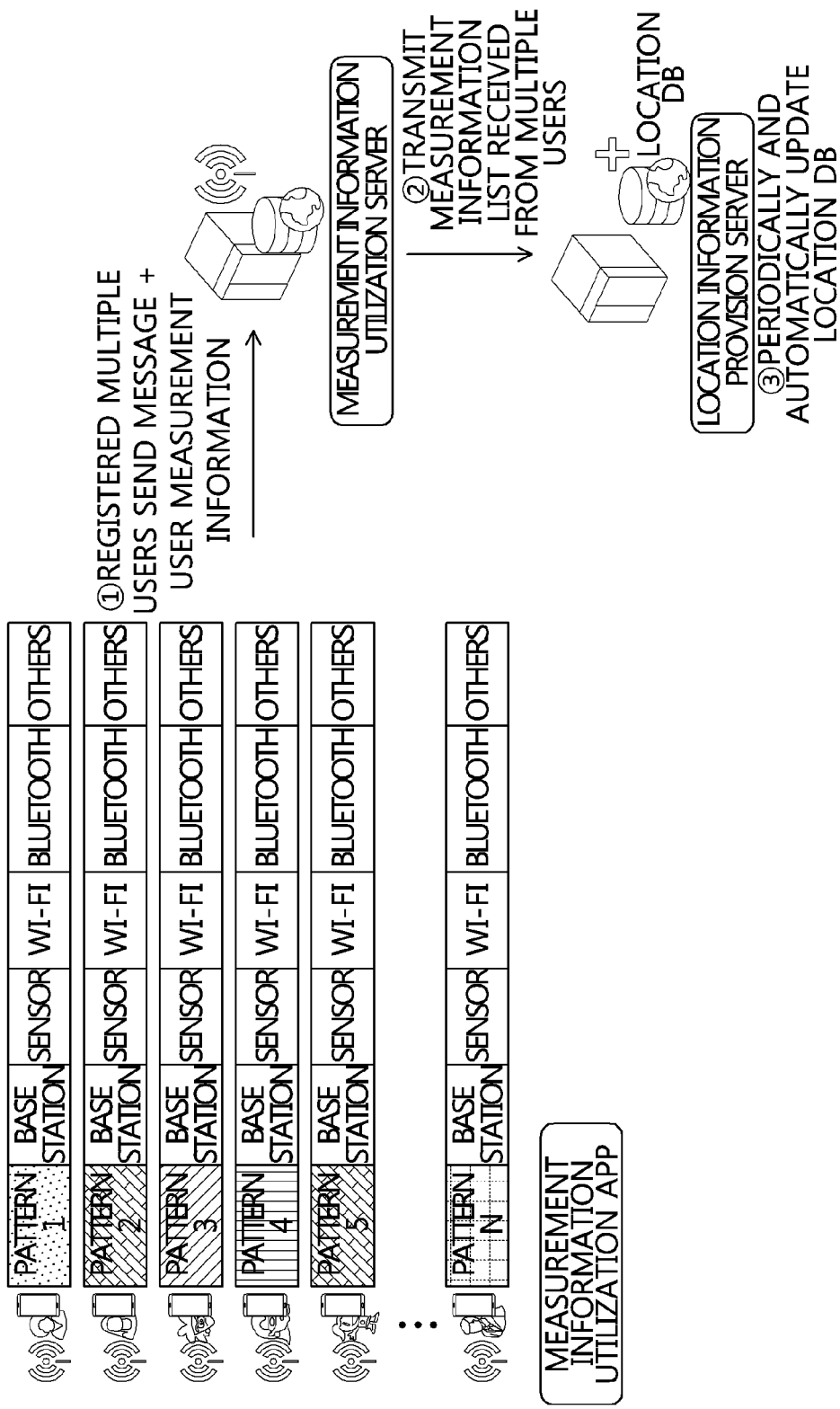
FIG. 15 is a diagram showing a procedure for updating a location DB using user measurement information according to an embodiment of the present invention.

FIG. 15 is a diagram showing a procedure for updating a location DB using user measurement information according to an embodiment of the present invention.

Referring to FIG. 15, the procedure for updating the location DB using the user measurement information according to an embodiment of the present invention may be performed based on user measurement information acquired from multiple users registered in a measurement information utilization application.

For example, the measurement information utilization server may generate a measurement information list based on user measurement information acquired from multiple users.

Thereafter, when the measurement information utilization server transmits the measurement information list to the location information provision server, the location information provision server may periodically and automatically update the location DB using the measurement information list. That is, it may be determined whether the locations of positioning infrastructure elements have changed, based on both the sensor information and the wireless communication heterogeneous infrastructure measurement information included in the measurement information list. If the locations of the positioning infrastructure elements have changed, information about the corresponding positioning infrastructure elements in the location DB may be updated.

Figure 16:
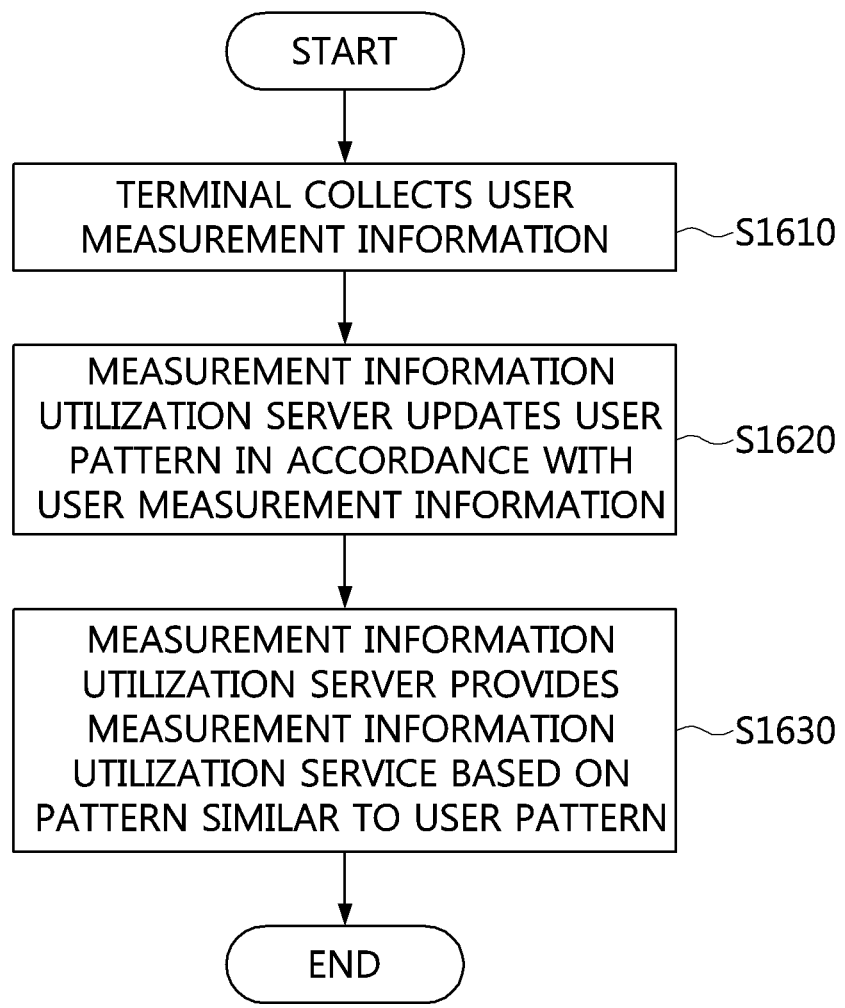
FIG. 16 is an operation flowchart showing a user participation-based measurement information utilization method according to an embodiment of the present invention.

FIG. 16 is an operation flowchart showing a user participation-based measurement information utilization method according to an embodiment of the present invention.

Referring to FIG. 16, the user participation-based measurement information utilization method according to the embodiment of the present invention is a measurement information utilization method performed by a user participation-based measurement information utilization system, wherein a terminal collects user measurement information corresponding to at least one of sensor information and wireless communication heterogeneous infrastructure measurement information, based on a measurement information utilization application at step S1610.

The measurement information utilization application may be a user application program that includes a measurement information collection module for utilizing the user participation-based measurement information utilization service on the user terminal.

The user measurement information may be generated by temporally synchronizing and combining the sensor information with the wireless communication heterogeneous infrastructure measurement information. That is, since modules for collecting the sensor information and the wireless communication heterogeneous infrastructure measurement information in the terminal are different from each other, pieces of information collected from the respective modules may be combined such that pieces of information collected in the same time slot are synchronized with each other.

Here, the message or a search condition input by the user, or location input information, may be combined with user measurement information and collected together. For example, when a message, a keyword or address information is input from the user through the measurement information utilization application, the collected sensor information and wireless communication heterogeneous infrastructure measurement information may be combined with the input information to generate user measurement information. Alternatively, only the sensor information and the wireless communication heterogeneous infrastructure measurement information may be combined to generate user measurement information. The user measurement information may be transmitted in association with the information input by the user at the time of transmission.

Here, the message may correspond to information such as a short message, a long message, a picture, a video, an emoticon, a discount coupon, and an advertisement, which can be sent by the user in the measurement information utilization application.

Here, the sensor information may be collected in response to at least one of a preset sensor information collection period and at least one automatic collection trigger, and may be collected using at least one of an acceleration sensor, a gyroscope, a geomagnetic sensor, a barometric sensor, and a camera.

Further, the wireless communication heterogeneous infrastructure measurement information may be collected through a separate heterogeneous infrastructure measurement information collection module, and may also be collected at the time at which sensor information is collected in synchronization with various types of sensors for collecting the sensor information.

Here, the wireless communication heterogeneous infrastructure measurement information may include the identification numbers (Cell-ID, MAC Address, UUID), or the like) of a mobile communication base station and a Short Range Node (SRN: short-range transmission/reception device) and measurement values (RSSI, RTT, AOA, etc.). Further, the SRN may include Bluetooth, BLE, and NFC nodes.

Here, the user measurement information may be collected by detecting at least one preset automatic collection trigger from among operations performed by the user, based on the measurement information utilization application on the terminal.

At this time, the user may be a user who has subscribed or has been registered with the measurement information utilization service according to the present invention. Therefore, in the measurement information utilization application, the operation of the user may function as a trigger for collecting the user measurement information, thus initiating the collection of the user measurement information.

Here, the at least one automatic collection trigger may correspond to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

For example, in the case of the SNS program, the operation of pressing a send button for transmitting text, a picture, or a video may correspond to a trigger operation, and in the case of the search program, the operation of inputting a keyword and pressing a search button may correspond to the trigger operation. In another example, in the case of a navigation program, the time at which the current location information is calculated in order to search for a path or the time at which the location information is displayed together with the path may be detected as a preset automatic collection trigger. Further, in the case of a location-based discount coupon and an advertisement provision program, the time at which a discount coupon is provided or the time at which an advertisement is provided may be detected as a preset automatic collection trigger. In a further example, in the case of a location-based payment program, the time at which a payment flow is initiated may be detected as a preset automatic collection trigger.

Further, in the user participation-based measurement information utilization method according to the embodiment of the present invention, a measurement information utilization server updates a user pattern corresponding to the user of the terminal in accordance with the user measurement information, based on the time at which the user measurement information is collected at step S1620.

Here, the user pattern may be utilized as attribute information required to identify the spatial characteristics of the user, rather than the user's location information, when the measurement information utilization service according to the present invention is provided. Therefore, in order to identify the spatial characteristics of the user corresponding to the time at which the user measurement information is collected, that is, the latest time, from the terminal of the user, the user pattern may be updated in accordance with the user measurement information.

Here, before updating the user pattern, past pattern histories may be stored in predetermined memory space of the measurement information utilization server. The past pattern histories stored in this way may be utilized together with the latest user pattern, depending on the correlation condition stored in the measurement information utilization server.

The measurement information utilization server may include a measurement information correlation DB for collecting user measurement information from multiple specified users who have subscribed to the measurement information utilization service and then generating a measurement information list.

Further, the user pattern may be stored in the measurement information correlation DB.

Further, in the user participation-based measurement information utilization method according to the embodiment of the present invention, the measurement information utilization server provides measurement information utilization service to the user based on one or more similar patterns having a correlation with the user pattern among multiple patterns included in the measurement information list at step S1630. That is, based on the user pattern rather than based on the user's location information, users determined to be located in a place close to the user are extracted, and then the measurement information utilization service may be provided.

The measurement information correlation DB may define reception correlations and frequencies between multiple positioning infrastructure elements, based on pieces of information stored in the measurement information list. For example, assuming that multiple Wi-Fi APs are uniformly distributed in a certain environment, the probability that the user will receive signals from the multiple Wi-Fi APs at a certain point in that environment may be high. Therefore, correlations between the Wi-Fi APs depending on the locations thereof may be detected by receiving pieces of user measurement information from the multiple unspecified users, who have subscribed to the measurement information utilization service, at that certain point in that certain environment.

Here, the spatial correlations between positioning infrastructure elements corresponding to wireless communication heterogeneous infrastructure measurement information may be detected based on multiple pieces of wireless communication heterogeneous infrastructure measurement information respectively corresponding to the multiple patterns.

Here, the measurement information list may include multiple patterns respectively corresponding to multiple users who have registered in the measurement information utilization application.

Therefore, multiple pieces of wireless communication heterogeneous infrastructure measurement information are acquired from the multiple patterns corresponding to multiple users, and thus spatial correlations between positioning infrastructure elements may be detected in an environment in which pieces of wireless communication heterogeneous infrastructure measurement information corresponding to the user patterns are present.

Here, the spatial correlations may be generated and used between homogeneous positioning infrastructure elements. Further, the frequencies with which multiple positioning infrastructure signals are simultaneously received are indicated together with the spatial correlations, and thus the correlations between the positioning infrastructure elements may be indicated in greater detail.

Further, one or more similar patterns corresponding to at least one positioning infrastructure element included in a preset reference level layer may be extracted from the hierarchical structure generated based on the spatial correlations.

In this case, the hierarchical structure may correspond to the indication of several positioning infrastructure elements included in the corresponding layer, among various level layers generated based on the positioning infrastructure element corresponding to the terminal of the user. Here, the positioning infrastructure element corresponding to the terminal of the user may be the positioning infrastructure element corresponding to the wireless communication heterogeneous infrastructure measurement information included in the user measurement information.

Here, as the level of the hierarchical structure is lower, the correlation with the terminal may be higher.

For example, when a Wi-Fi AP corresponding to the terminal of the user is assumed to be AP 41, APs having a higher correlation with the AP 41 may be included in a low level layer in the hierarchical structure. That is, APs located spatially, closer to the AP 41 may be included in the low level layer.

Here, the hierarchical structure may be generated based on the reception range of radio waves corresponding to the terminal. That is, when the reception range of radio waves corresponding to the user terminal is wide, many signals from positioning infrastructure elements may be simultaneously received at the location of the terminal, and thus the number of positioning infrastructure elements included in the low level layer in the hierarchical structure may increase, compared to the case of a terminal for which the reception range of radio waves is narrow.

Therefore, the accuracy of extracted similar patterns may be improved by setting a preset reference layer according to the terminal.

Here, each of one or more similar patterns may be a pattern having information about positioning infrastructure elements included in the set reference layer as user measurement information. That is, when another terminal is located in a place spatially close to the user terminal, a positioning infrastructure signal received by the other terminal may be similar to the positioning infrastructure signal received by the user terminal. Therefore, the pattern in which the signal of a positioning infrastructure element, which is included in the preset reference layer and has a high spatial correlation with the user terminal, is received may be extracted as a similar pattern.

Here, the measurement information utilization service may be at least one of a message-sending service for sending a message, received together with user measurement information from the terminal, to the terminals corresponding to one or more similar patterns, and a search service for providing the terminal with the measurement information of patterns that match a search condition received together with the user measurement information from the terminal, among one or more similar patterns based on the search condition.

For example, in the case of a message-sending service, when discount information of a store is input as a message through a terminal provided in the store, the measurement information utilization service may be used to transmit discount information to the terminals of users corresponding to a pattern similar to that of the terminal located in the store. That is, the users located spatially close to the store may be induced to purchase commodities in the store by providing information about the store to the users.

In another example, in the case of a search service, when the user enters 'popular restaurant' as a search condition at the current location, patterns having information that corresponds to a pattern similar to that of the terminal and matches 'popular restaurant', which is the search condition, may be searched for. When patterns having information that corresponds to a pattern similar to that of the terminal and matches 'popular restaurant' are found, information corresponding to the patterns may be provided to the terminal of the user. Here, as the information corresponding to the patterns, pictures, comments, or URLs pertaining to the popular restaurants may be provided.

Further, although not shown in FIG. 16, in the user participation-based measurement information utilization method according to the embodiment of the present invention, a location information provision server calculates the location information of the terminal (user) by comparing location information stored in the location DB with the user measurement information.

Here, the service for providing the location information of the terminal based on the location information provision server may be selectively executed only when the measurement information utilization server requires the location information of the user.

Here, the location DB may be constructed in advance based on the user measurement information acquired from the measurement information utilization server.

Further, the location information provision server may calculate the location of the user (terminal) by comparing the sensor information and the wireless communication heterogeneous infrastructure measurement information, included in the user measurement information, with the information stored in the location DB.

Here, the location information of the terminal may be transferred to the terminal through the measurement information utilization server.

Further, although not shown in FIG. 16, in the user participation-based measurement information utilization method according to the embodiment of the present invention, the location information provision server determines whether location input information is included in a preset correlation level in the hierarchical structure generated based on the location information when location input information, which is input by the user together with the user measurement information, is received, and then applies the location input information to the location DB.

Here, the location input information may correspond to address information input by the user or location information selected by the user from a map. That is, a location DB may be additionally generated based on the user measurement information that is received together with the address information input through the user measurement information utilization application. However, if the location input information input by the user is not accurate, the accuracy of the location DB may be deteriorated.

Thereafter, to check whether the location input information input by the user is accurate, location information close to the location input information is searched for in the existing location DB, and a correlation may be determined based thereon. That is, the hierarchical structure is generated based on the location information close to the location input information, and whether the location corresponding to the location input information is included in a preset correlation level in the hierarchical structure may be determined.

Here, the preset correlation level is set to a level that is as low as possible, thus improving the accuracy of the location DB.

Further, based on the user measurement information transmitted together with the location input information, the place where the location corresponding to the location input information is included in the hierarchical structure may be determined.

For example, if the preset correlation level is assumed to correspond to the layer 2 level, the location DB may be generated using the corresponding location information only when the location corresponding to the address information input by the user is included only in the layer 2 level.

Furthermore, although not shown in FIG. 16, in the user participation-based measurement information utilization method according to the embodiment of the present invention, the location information provision server updates the location DB based on the measurement information list at regular intervals of a preset update period.

At this time, since the positioning infrastructure information stored in the location DB may change with the lapse of time, the location information provision server may update the location DB by periodically acquiring a measurement information list.

Here, in the measurement information list, user patterns for users who are registered in the measurement information utilization application are stored, and thus the user measurement information transmitted most recently from the users may be included in the measurement information list. Therefore, the location DB may also be updated based on the most recently transmitted user measurement information.

Further, although not shown in FIG. 16, the user participation-based measurement information utilization method according to the embodiment of the present invention stores various types of information generated during a user participation-based measurement information utilization procedure according to the embodiment of the present invention.

According to an embodiment, a storage module for storing information may be configured independent of the user participation-based measurement information utilization server, and may then support a function for the user participation-based measurement information utilization. Here, the storage module may act as a separate large-capacity storage, and may include a control function for performing operations.

By means of the user participation-based measurement information utilization method, the sensor information and the wireless communication heterogeneous infrastructure measurement information of the user terminals may be collected, utilized, and provided based on respective measurement information utilization applications that operate on the terminals of multiple unspecified normal users.

Further, a new location-based service based on measurement information rather than location information may be provided.

Furthermore, there can be provided a method for collecting sensor information and wireless communication heterogeneous infrastructure measurement information as required by the measurement information utilization application, without the user separately making effort to collect information on the terminal.

Furthermore, when the location-based service is provided, personal location information is not directly collected, and thus additional development costs for privacy protection may be minimized and the range of legal responsibility may be narrowed when location information is utilized.

Figure 17:
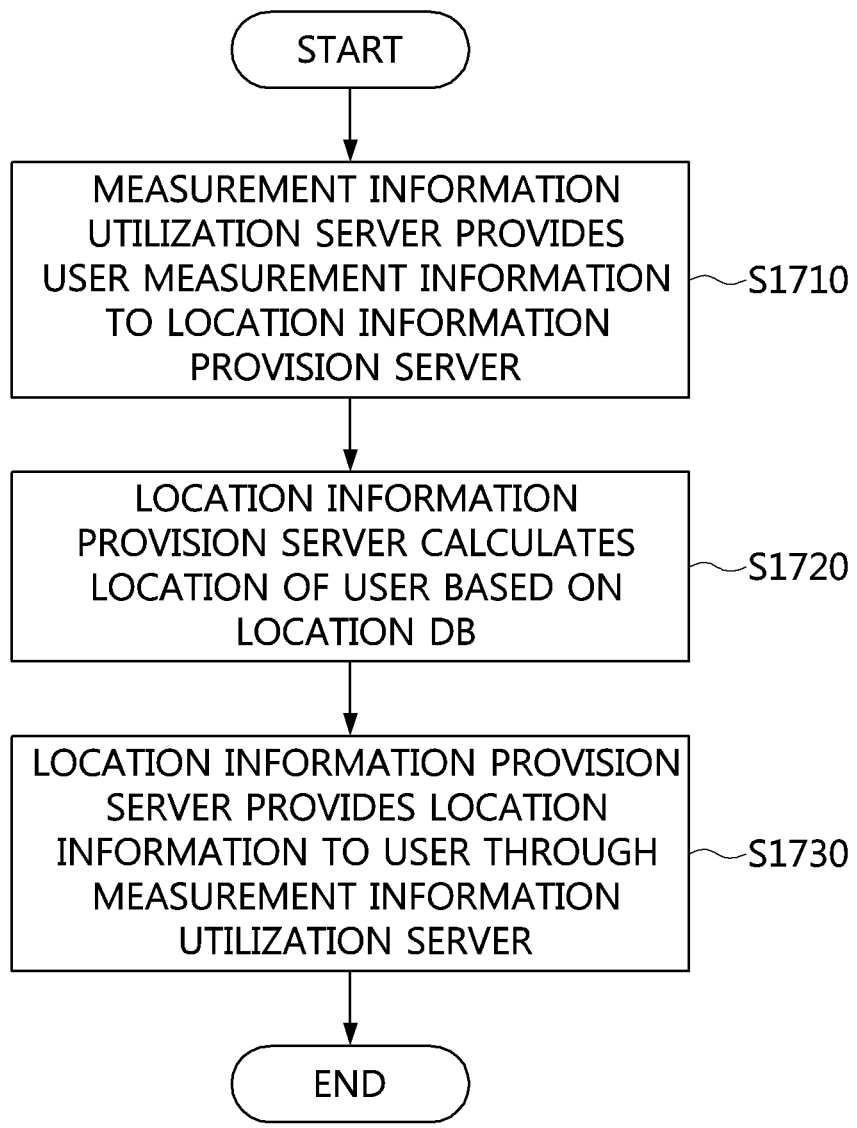
FIG. 17 is an operation flowchart showing in detail a procedure for providing location information in the user participation-based measurement information utilization method of FIG. 16.

FIG. 17 is an operation flowchart showing in detail a procedure for providing location information in the user participation-based measurement information utilization method shown in FIG. 16.

Referring to FIG. 17, in the location information provision procedure in the user participation-based measurement information utilization method shown in FIG. 16, a measurement information utilization server provides user measurement information to a location information provision server at step S1710.

Here, the location information may be selectively provided only when the measurement information utilization server requires the location information of a terminal.

Thereafter, the location information provision server calculates the location of the user based on a location DB at step S1720.

Here, the location DB may be constructed in advance by acquiring user measurement information from the measurement information utilization server. For example, when the user transmits the user measurement information while inputting a specific address through the measurement information utilization application, the measurement information utilization server may forward the received address and user measurement information to a location information provision server. Thereafter, the location information provision server may determine the accuracy of the received address, and may newly apply information corresponding to that address to the location DB.

Thereafter, the location information provision server provides location information to the user through the measurement information utilization server at step S1730.

Here, the location information provision server may compare the sensor information and the wireless communication heterogeneous infrastructure measurement information, which are included in the user measurement information, with the information stored in the location DB, and may calculate, as the location information of the user, a location for which the positioning infrastructure information is identical or similar to that of the location DB.

Figure 18:
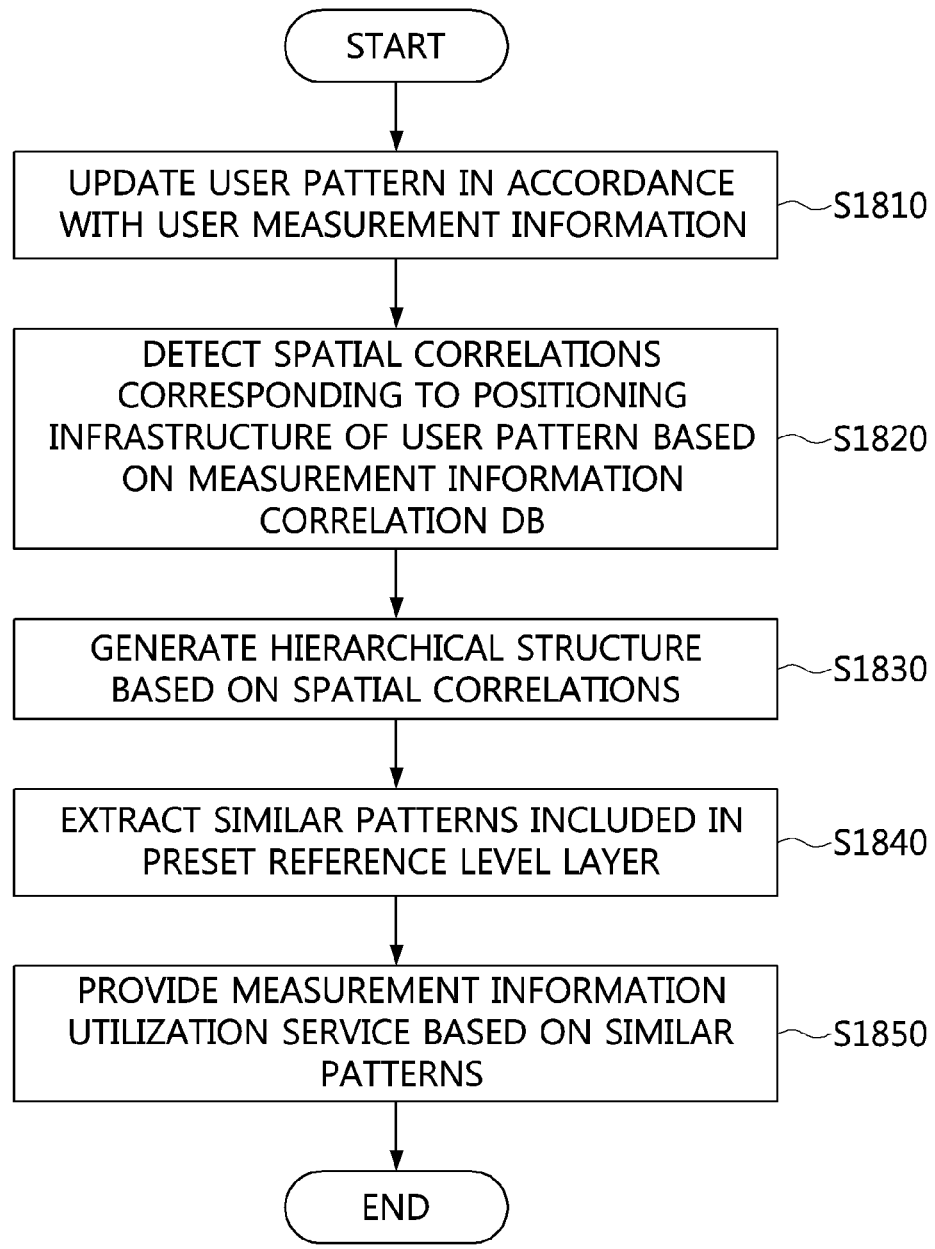
FIG. 18 is an operation flowchart showing in detail the user participation-based measurement information utilization method according to an embodiment of the present invention.

FIG. 18 is an operation flowchart showing in detail a user participation-based measurement information utilization method according to an embodiment of the present invention.

Referring to FIG. 18, the user participation-based measurement information utilization method according to the embodiment of the present invention updates a user pattern in accordance with user measurement information received from a terminal at step S1810.

Here, user measurement information may be collected by detecting at least one preset automatic collection trigger based on the measurement information utilization application installed on the terminal.

Further, the user measurement information may be generated by temporally synchronizing and combining the sensor information with the wireless communication heterogeneous infrastructure measurement information. Here, the message, the search condition, or location input information, which is input by the user, may be combined together with the user measurement information.

Here, the at least one automatic collection trigger may correspond to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

Here, the user pattern may be utilized as attribute information required to identify the spatial characteristics of the user, rather than the user's location information, when the measurement information utilization service according to the present invention is provided. Therefore, in order to identify the spatial characteristics of the user corresponding to the time at which the user measurement information is collected, that is, the latest time, from the terminal of the user, the user pattern may be updated in accordance with the user measurement information.

Thereafter, spatial correlations corresponding to the positioning infrastructure elements of the user pattern are detected based on the measurement information correlation DB at step S1820.

Here, the measurement information correlation DB may define may define reception correlations and frequencies between multiple positioning infrastructure elements, based on pieces of information stored in the measurement information list. Therefore, spatial correlations between positioning infrastructure elements corresponding to wireless communication heterogeneous infrastructure measurement information may be detected based on multiple pieces of wireless communication heterogeneous infrastructure measurement information that respectively correspond to multiple patterns corresponding to multiple users registered in the measurement information utilization application based on the measurement correlation DB.

Next, a hierarchical structure is generated based on the spatial correlations at step S1830.

In this case, the hierarchical structure may correspond to the indication of several positioning infrastructure elements included in the corresponding layer, among various level layers generated based on the positioning infrastructure element corresponding to the terminal of the user. Here, the positioning infrastructure element corresponding to the terminal of the user may be the positioning infrastructure element corresponding to the wireless communication heterogeneous infrastructure measurement information included in the user measurement information.

Here, as the level of the hierarchical structure is lower, the correlation with the terminal may be higher.

Thereafter, one or more similar patterns included in a preset reference level layer in the hierarchical structure are extracted at step S1840.

Here, the hierarchical structure may be generated based on the reception range of radio waves corresponding to the terminal. That is, when the reception range of radio waves corresponding to the user terminal is wide, many signals from positioning infrastructure elements may be simultaneously received at the location of the terminal, and thus the number of positioning infrastructure elements included in the low level layer in the hierarchical structure may increase, compared to the case of a terminal for which the reception range of radio waves is narrow. Therefore, the accuracy of the extracted similar pattern may be improved by setting reference layers depending on the terminals.

Thereafter, a measurement information utilization service is provided based on the one or more similar patterns at step S1850.

Here, each of one or more similar patterns may be a pattern having information about positioning infrastructure elements included in the set reference layer as user measurement information. That is, when another terminal is located in a place spatially close to the user terminal, a positioning infrastructure signal received by the other terminal may be similar to the positioning infrastructure signal received by the user terminal. Therefore, the pattern in which the signal of a positioning infrastructure element, which is included in the preset reference layer and has a high spatial correlation with the user terminal, is received may be extracted as a similar pattern.

Here, the measurement information utilization service may be at least one of a message-sending service for sending a message, received together with user measurement information from the terminal, to the terminals corresponding to one or more similar patterns, and a search service for providing the terminal with the measurement information of patterns that match a search condition received together with the user measurement information from the terminal, among one or more similar patterns based on the search condition.

In accordance with the present invention, there can be provided location-based service, which collect sensor information and wireless communication heterogeneous infrastructure information of a user terminal, based on measurement information utilization applications that operate in the terminals of multiple unspecified normal users and which can be provided using the collected information.

Further, the present invention can provide a new location-based service based on measurement information rather than location information.

Furthermore, the present invention can provide a method for collecting sensor information and wireless communication heterogeneous infrastructure measurement information as required by a measurement information utilization application without the user separately making effort to collect data on the terminal.

Furthermore, the present invention can minimize additional development expense for protection and reduce the range of legal responsibility when location information is utilized, because the location information of each individual is not directly collected at the time of providing a location-based service.

As described above, in the measurement information utilization system and the user participation-based measurement information utilization method and apparatus according to the present invention, the configurations and schemes in the above-described embodiments are not limitedly applied, and some or all of the above embodiments can be selectively combined and configured so that various modifications are possible.

What is claimed is:

1. A user participation-based measurement information utilization server comprising:
 a measurement information collector which collects user measurement information corresponding to at least one of sensor information and wireless communication heterogeneous infrastructure measurement information from a terminal of a user, on which a measurement information utilization application is installed;
 a pattern updater which updates a user pattern corresponding to the user in a measurement information correlation database (DB) in accordance with the user measurement information based on a time at which the user measurement information is collected; and
 a service provider which provides a measurement information utilization service to the user based on one or more similar patterns having a correlation with the user pattern among multiple patterns included in a measurement information list, wherein the measurement information list is generated by receiving the user measurement information from multiple users who have subscribed to the measurement information utilization service.

2. The user participation-based measurement information utilization server of claim 1, wherein the service provider comprises:
 a spatial correlation detector which detects spatial correlations between positioning infrastructure elements corresponding to the wireless communication heterogeneous infrastructure measurement information, based on multiple pieces of wireless communication heterogeneous infrastructure measurement information respectively corresponding to the multiple patterns; and
 a similar pattern extractor which extracts the one or more similar patterns corresponding to at least one positioning infrastructure element included in a preset reference level layer in a hierarchical structure generated based on the spatial correlations.

3. The user participation-based measurement information utilization server of claim 2, wherein the correlation with the terminal is higher as a level of the hierarchical structure becomes lower.

4. The user participation-based measurement information utilization server of claim 3, wherein the similar pattern extractor generates the hierarchical structure based on a reception range of radio waves corresponding to the terminal.

5. The user participation-based measurement information utilization server of claim 2, wherein the measurement information utilization service is at least one of a message-sending service for sending a message, received together with user measurement information from the terminal, to terminals corresponding to the one or more similar patterns, and a search service for providing the terminal with measurement information of a pattern that matches a search condition received together with the user measurement information from the terminal, among the one or more similar patterns, based on the search condition.

6. The user participation-based measurement information utilization server of claim 1, wherein the user measurement information is collected by the terminal detecting at least one preset automatic collection trigger among operations performed by the user based on the measurement information utilization application.

7. The user participation-based measurement information utilization server of claim 6, wherein the at least one automatic collection trigger corresponds to at least one of a send button pressing time corresponding to a Social Network Service (SNS) program, a keyword search button pressing time corresponding to a search program, a location information calculation time, corresponding to a navigation program, a location information display completion time corresponding to the navigation program, a discount, coupon and advertisement provision time corresponding to a location-based discount coupon and advertisement provision program, and a payment start time corresponding to a location-based payment program.

8. The user participation-based measurement information utilization server of claim 7, wherein the sensor information is collected in response to at least one of a preset sensor information collection period and the at least one automatic collection trigger, and is collected using at least one of an acceleration sensor, a gyroscope, a geomagnetic sensor, a barometric sensor, and a camera.

9. The user participation-based measurement information utilization server of claim 8, wherein the user measurement information is generated by temporally synchronizing and combining the sensor information with the wireless communication heterogeneous infrastructure measurement information.

10. The user participation-based measurement information utilization server of claim 1, wherein the measurement information list includes the multiple patterns respectively corresponding to multiple users registered in the measurement information utilization application.

11. A terminal comprising:
a trigger detector which detects at least one preset automatic collection trigger, among operations performed by a user;
a collector which collects at least one of sensor information and wireless communication heterogeneous infrastructure measurement information at a current location, based on a measurement information utilization application, when the at least one automatic collection trigger is detected;
a measurement information generator which generates user measurement information by temporally synchronizing and combining the sensor information with the wireless communication heterogeneous infrastructure measurement information; and
a measurement information transmitter which transmits the user measurement information to a measurement information utilization server so as to be provided, with, measurement information utilization service corresponding to the current location, wherein the measurement information utilization service is based on one or more similar patterns having a correlation with a user pattern corresponding to the user in accordance with the user measurement information.

12. A user participation-based measurement information utilization method performed by a user participation-based measurement information, utilization system, the method comprising:
collecting, by a terminal, user measurement information corresponding to at least one of sensor information and wireless communication heterogeneous infrastructure measurement information based on a measurement information utilization application; and
updating, by a measurement information utilization server, a user pattern corresponding to a user of the terminal in accordance with the user measurement information, based on a time at which the user measurement information is collected, and providing, by the measurement information utilization server, measurement information utilization service to the user based on one or more similar patterns having a correlation with the user pattern, among multiple patterns included in a measurement information list, wherein the measurement information list is generated by receiving the user measurement information from multiple users who have subscribed to the measurement information utilization service.

13. The user participation-based measurement information utilization method of claim 12, wherein providing the measurement information utilization service comprises:
detecting spatial correlations between positioning infrastructure elements corresponding to the wireless communication heterogeneous infrastructure measurement information, based on multiple pieces of wireless communication heterogeneous infrastructure measurement information respectively corresponding to the multiple patterns; and
extracting the one or more similar patterns corresponding to at least one positioning infrastructure element included in a preset reference level layer in a hierarchical structure generated based on the spatial correlations.

14. The user participation-based, measurement information utilization method of claim 13, wherein a distance to the terminal is shorter as a level of the hierarchical structure becomes lower.

15. The user participation-based measurement information utilization method of claim 14, wherein providing the measurement information utilization service is configured to generate the hierarchical structure based on a reception range of radio waves corresponding to the terminal.

16. The user participation-based measurement information utilization method of claim 13, wherein the measurement information utilization service is at least one of a message-sending service for sending a message, received together with user measurement information from the terminal, to terminals corresponding to the one or more similar patterns, and a search service for providing the terminal with measurement information of a pattern that matches a search condition received together with the user measurement information from the terminal, among the one or more similar patterns, based on the search condition.

17. The user participation-based measurement information utilization method of claim 12, wherein:
the user measurement information is collected by the terminal detecting at least one preset automatic collection trigger among operations performed by the user based on the measurement information utilization application, and
the at least one automatic collection trigger corresponds to at least one of a send button pressing time corresponding to a Social Network Service (SNS) program, a keyword search button pressing time corresponding to a search program, a location information calculation time corresponding to a navigation program, a location information display completion time corresponding to the navigation program, a discount coupon and advertisement provision time corresponding to a location-based discount coupon and advertisement provision program, and a payment start time corresponding to a location-based payment program.

18. The user participation-based measurement information utilization method of claim 13, further comprising calculating, by a location information provision server, location information of the terminal by comparing information in a location DB with the user measurement information.

19. The user participation-based measurement information utilization method of claim 13, further comprising:
when location input information input by the user together with the user measurement information is received, determining, by the location information provision server, whether the location input information is included in a preset correlation level in a hierarchical structure generated based on location information, and then applying the location input information to the location DB.

20. The user participation-based measurement information utilization method of claim 19, further comprising updating, by the location information provision server, the location DB based on the measurement information list at regular intervals of a preset update period.

* * * * *